US008648684B2

(12) United States Patent
Noda et al.

(10) Patent No.: US 8,648,684 B2
(45) Date of Patent: Feb. 11, 2014

(54) VOLTAGE TRANSFORMING APPARATUS

(75) Inventors: Toshihiro Noda, Chiyoda-ku (JP);
Katsumi Konii, Chiyoda-ku (JP)

(73) Assignee: Mitsubishi Electric Corporation,
Chiyoda-Ku, Tokyo (JP)

( * ) Notice: Subject to any disclaimer, the term of this patent is extended or adjusted under 35 U.S.C. 154(b) by 166 days.

(21) Appl. No.: 13/392,478

(22) PCT Filed: Nov. 19, 2010

(86) PCT No.: PCT/JP2010/070702
§ 371 (c)(1),
(2), (4) Date: Feb. 24, 2012

(87) PCT Pub. No.: WO2011/068044
PCT Pub. Date: Jun. 9, 2011

(65) Prior Publication Data
US 2012/0154090 A1 Jun. 21, 2012

(30) Foreign Application Priority Data

Dec. 4, 2009 (WO) .................. PCT/JP2009/070394

(51) Int. Cl.
*H01F 27/29* (2006.01)
*H01F 21/02* (2006.01)
*H01F 27/28* (2006.01)

(52) U.S. Cl.
USPC ........... 336/192; 336/148; 336/182; 336/220; 336/222

(58) Field of Classification Search
USPC ........................ 336/148, 182, 192, 220, 222
See application file for complete search history.

(56) References Cited

U.S. PATENT DOCUMENTS

| 7,825,765 B2 * | 11/2010 | Kawasaki et al. ............. 336/212 |
| 2002/0126511 A1 | 9/2002 | Kalvelage et al. |
| 2008/0101097 A1 * | 5/2008 | Kawasaki et al. ............... 363/20 |
| 2010/0284205 A1 * | 11/2010 | Noda et al. ...................... 363/71 |
| 2011/0248813 A1 | 10/2011 | Noda et al. |

FOREIGN PATENT DOCUMENTS

| JP | 51-045257 A | 4/1976 |
| JP | 63-209113 | 8/1988 |
| JP | 2-155401 A | 6/1990 |
| JP | 2-184007 A | 7/1990 |

(Continued)

OTHER PUBLICATIONS

International Search Report (PCT/ISA/210) issued on Mar. 3, 2011, by Japanese Patent Office as the International Searching Authority for International Application No. PCT/JP2010/070702.

(Continued)

*Primary Examiner* — Tsz Chan
(74) *Attorney, Agent, or Firm* — Buchanan Ingersoll & Rooney PC

(57) ABSTRACT

A voltage transforming apparatus includes a primary winding receiving an AC voltage, a plurality of secondary windings that are different in number of turns, and a voltage conversion circuit for converting an AC voltage induced in each of the plurality of secondary windings. Each of the plurality of secondary windings includes the first terminal and the second terminal each having a potential that is not fixed. The first terminal and the second terminal are separately provided in each of the secondary windings. The voltage transforming apparatus further includes a switching circuit for selectively connecting the first terminal and the second terminal of each of the plurality of secondary windings to the voltage conversion circuit.

5 Claims, 19 Drawing Sheets

(56) References Cited

FOREIGN PATENT DOCUMENTS

| JP | 2-307303 A | 12/1990 |
| JP | 4-148012 A | 5/1992 |
| JP | 7-320957 A | 12/1995 |
| JP | 2002-315344 A | 10/2002 |
| JP | 2004-297900 A | 10/2004 |
| JP | 2006-204036 A | 8/2006 |
| JP | 2009-182115 A | 8/2009 |
| JP | 4523076 B1 | 8/2010 |
| TW | 200939262 A | 9/2009 |
| WO | WO 93/14508 A1 | 7/1993 |
| WO | WO 2010-092676 A1 | 8/2010 |
| WO | WO 2010/103859 A1 | 9/2010 |

OTHER PUBLICATIONS

Japanese Office Action issued on Jul. 20, 2010 (2 pages), with English language translation (3 pages).
Japanese Office Action issued on Feb. 22, 2011 (2 pages), with English language translation (2 pages).
Office Action dated Jul. 30, 2013, issued by the Taiwanese Patent Office in the corresponding Taiwanese Patent Application No. 099141676 and an English translation thereof. (5 pages).

* cited by examiner

VOLTAGE TRANSFORMING APPARATUS

TECHNICAL FIELD

The present invention relates to a voltage transforming apparatus, and particularly to a voltage transforming apparatus converting each of several types of alternating-current (AC) voltages into a desirable voltage.

BACKGROUND ART

Conventionally, railroad vehicles such as a Shinkansen bullet train are required to travel at a higher speed and to have a large transportation capacity. In order to satisfy the requirements, it is necessary to reduce the size and the weight of each ancillary device mounted in a railroad vehicle, whereas the vehicle-mounted transformer is increased in capacity in order to satisfy the requirements for high-speed traveling and mass transportation.

In recent years, there are increasing demands for a low-floor vehicle for the purpose of achieving a barrier-free design. Accordingly, with regard to the devices disposed under the floor of the vehicle such as a vehicle-mounted transformer, there is a strong demand for reduction in size and weight.

There is also a railroad vehicle that runs through a plurality of sections in which AC voltages supplied from an overhead wire and the like are different. In the transformer mounted in such a vehicle, even when the AC voltage supplied to the vehicle varies, the transformer is required to output a desired AC voltage.

Japanese Patent Laying-Open No. 63-209113 (PTL 1) discloses a tap changer for changing the turns ratio in the transformer, which is configured for suppressing the oscillating voltage generated by a surge voltage.

CITATION LIST

Patent Literature

PTL 1: Japanese Patent Laying-Open No. 63-209113

SUMMARY OF INVENTION

Technical Problem

In the case where a transformer provided with a plurality of terminals (taps and the like) in the middle of one low-voltage side winding as disclosed in the above-described PTL 1 is mounted in the railroad vehicle that runs through several sections of different AC voltages, the terminal through which a voltage is extracted should be selected in accordance with the voltage supplied to the vehicle. However, an induction voltage is generated also at the open end, that is, at the terminal of the secondary winding that is not used. When this induction voltage is increased, there is a need to increase the insulation size such as a distance between the winding and the iron core. This makes it difficult to achieve reduction in size and weight of the transformer. PL1 fails to disclose the configuration for solving the above-described problems.

The present invention has been made to solve the above-described problems. An object of the present invention is to provide a voltage transforming apparatus that can convert several types of AC voltages and can be reduced in size and weight.

Solution to Problem

A voltage transforming apparatus according to an aspect of the present invention is to be mounted in a vehicle and includes a primary winding receiving an AC voltage; a plurality of secondary windings that are different in number of turns; and a voltage conversion circuit for converting an AC voltage induced in each of the plurality of secondary windings. Each of the plurality of secondary windings includes a first terminal and a second terminal each having a potential that is not fixed. The first terminal and the second terminal are separately provided in each of the secondary windings. Furthermore, the voltage transforming apparatus includes a switching circuit for selectively connecting the first terminal and the second terminal of each of the plurality of secondary windings to the voltage conversion circuit.

Advantageous Effects of Invention

The present invention allows implementation of a voltage transforming apparatus that can convert several types of AC voltages and can be reduced in size and weight.

DESCRIPTION OF EMBODIMENTS

Figure 1:
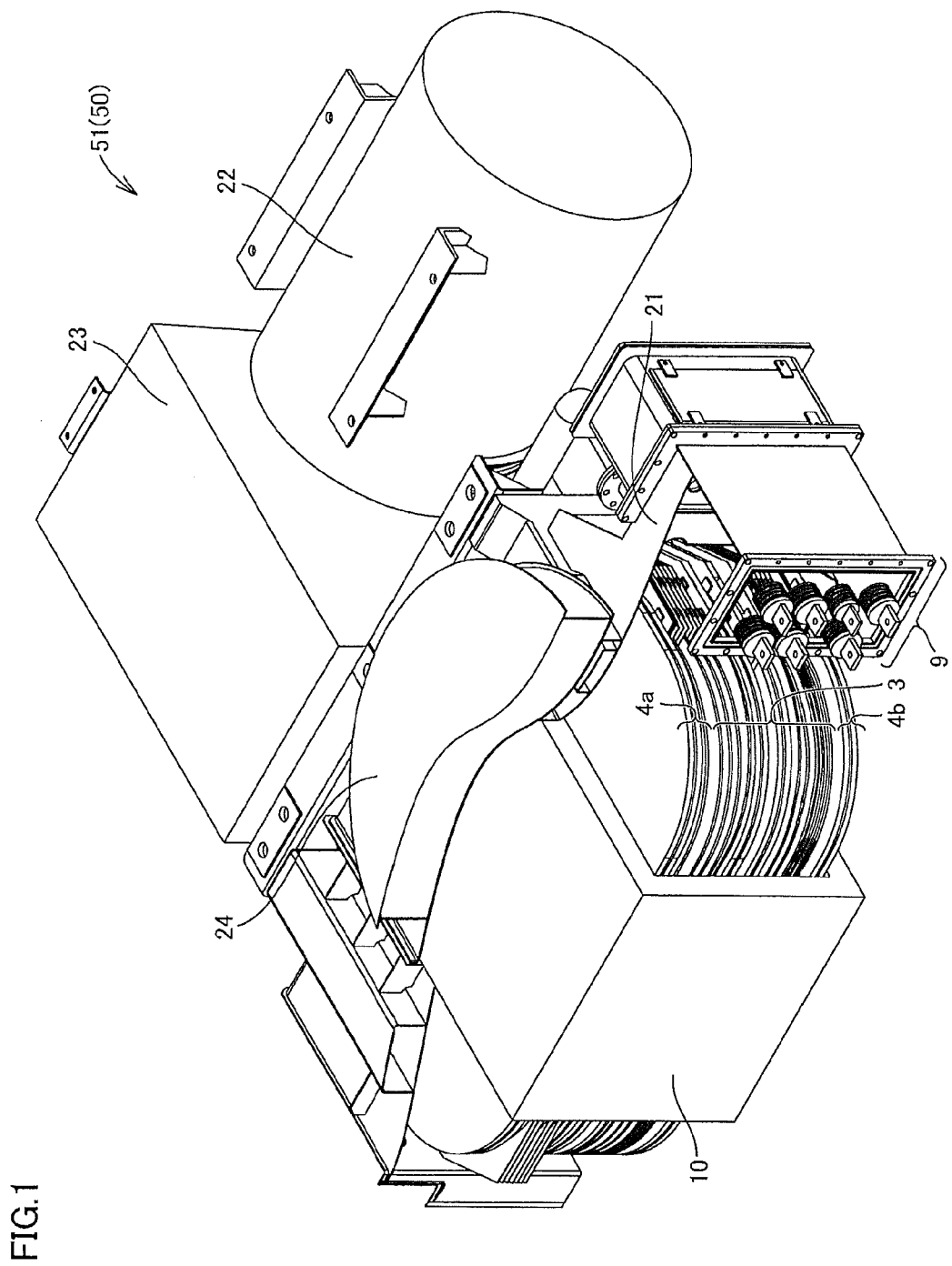
FIG. 1 is a diagram showing an example of the configuration of a transformer according to the first embodiment of the present invention.

The embodiments of the present invention will be hereinafter described with reference to the accompanying drawings, in which the same or corresponding components are designated by the same reference characters, and description thereof will not be repeated.

First Embodiment

FIG. 1 is a diagram showing an example of the configuration of a transformer according to the first embodiment of the present invention. The transformer according to the first embodiment is mounted in a railroad vehicle.

Referring to FIG. 1, a transformer 51 includes a primary winding (high-voltage side coil) 3, a secondary windings (low-voltage side coils) 4a and 4b, a terminal 9, an iron core 10, and a tank 21.

Primary winding 3, secondary windings 4a and 4b are wound around iron core 10. Tank 21 houses primary winding 3, secondary windings 4a and 4b, and iron core 10. Tank 21 is filled with insulation oil (not shown). Secondary windings 4a and 4b each have terminal 9.

Transformer 51 further includes a motor-driven blower 22, a cooler 23 and a conservator 24. Motor-driven blower 22 blows air into cooler 23 for cooling the insulation oil within transformer 51 (tank 21). Cooler 23 cools the insulation oil within transformer 51 (tank 21). In addition, the wind caused during running of the railroad vehicle may be introduced into cooler 23. In this case, motor-driven blower 22 may be omitted from the configuration shown in FIG. 1.

Conservator 24 is inflated or deflated by the change of the volume of the insulation oil. When the insulation oil is heated by heat generation of the primary winding and the secondary winding, the volume of the insulation oil is increased. In this case, conservator 24 is inflated. On the other hand, when the temperature of the insulation oil is lowered, the volume of the insulation oil is reduced. In this case, conservator 24 is deflated.

Figure 2:
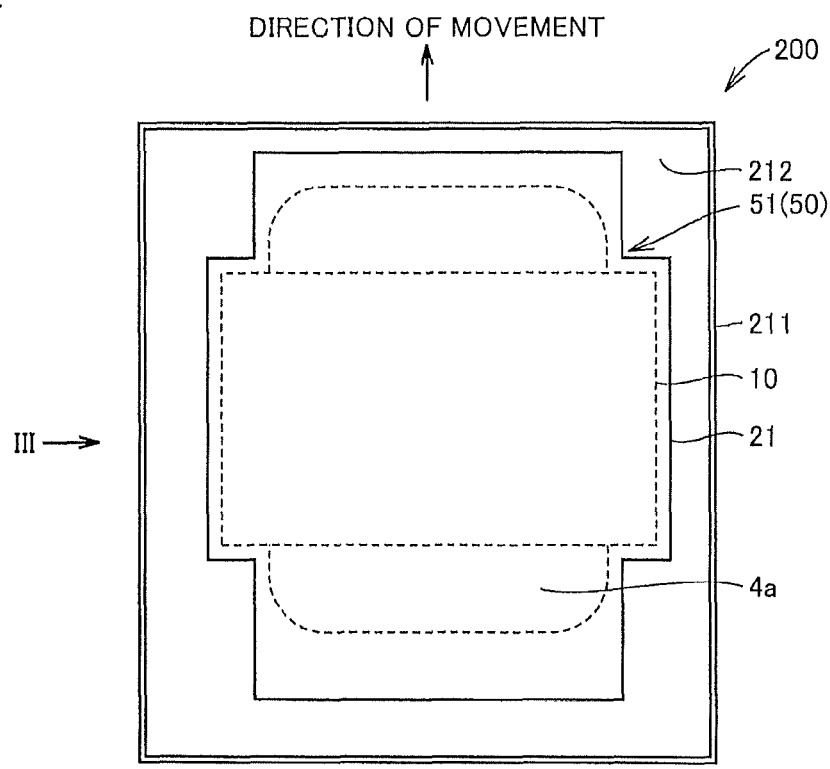
FIG. 2 is a perspective view of the transformer as seen from above a railroad vehicle.
Figure 3:
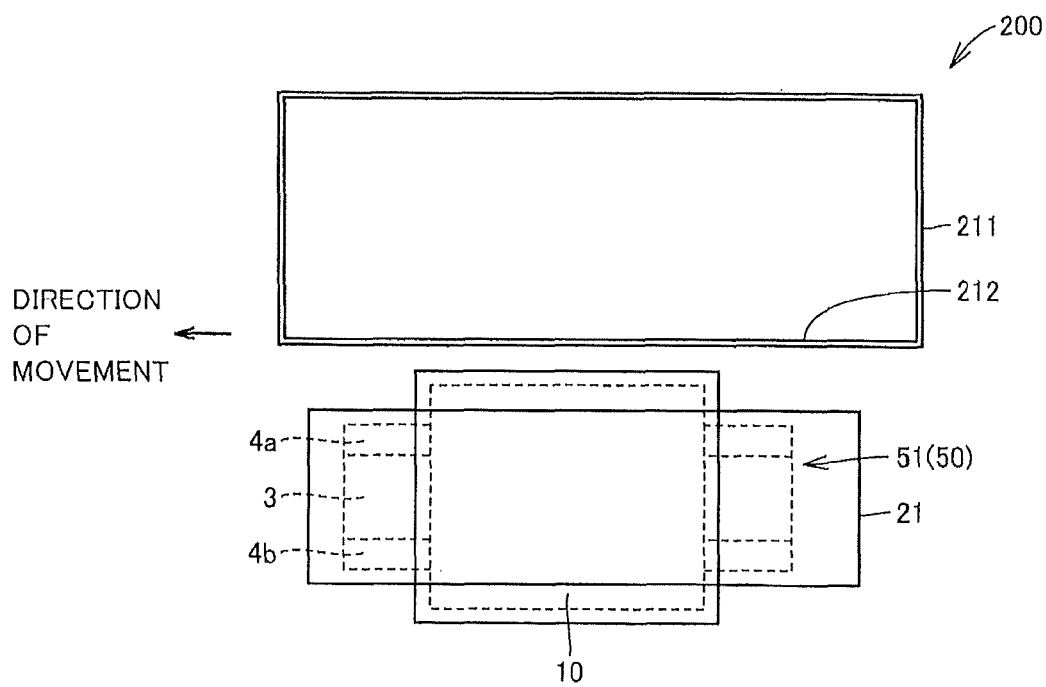
FIG. 3 is a diagram showing the transformer as seen from the side of the railroad vehicle.

FIGS. 2 and 3 each are a diagram schematically showing the arrangement of the transformer in the railroad vehicle shown in FIG. 1. FIG. 2 is a perspective view of the transformer as seen from above the railroad vehicle. FIG. 3 is a diagram showing the transformer as seen from the side of the railroad vehicle. It is to be noted that FIGS. 2 and 3 each representatively show tank 21, iron core 10 and windings (primary winding 3 and secondary windings 4a, 4b) of the components shown in FIG. 1. Referring to FIGS. 2 and 3, a railroad vehicle 200 has a vehicle body 211 and transformer 51. Transformer 51 is disposed below a floor 212 of vehicle body 211.

Not only the transformer but also various devices are disposed below the floor of vehicle body 211. The space for disposing these devices is limited by the length and the width of the vehicle body, and also by the height of the floor of the vehicle. In recent years, the space for disposing the transformer is further limited in order to satisfy the requirement for achieving a low-floor vehicle. Therefore, the size reduction of the transformer is strongly demanded.

Figure 4:
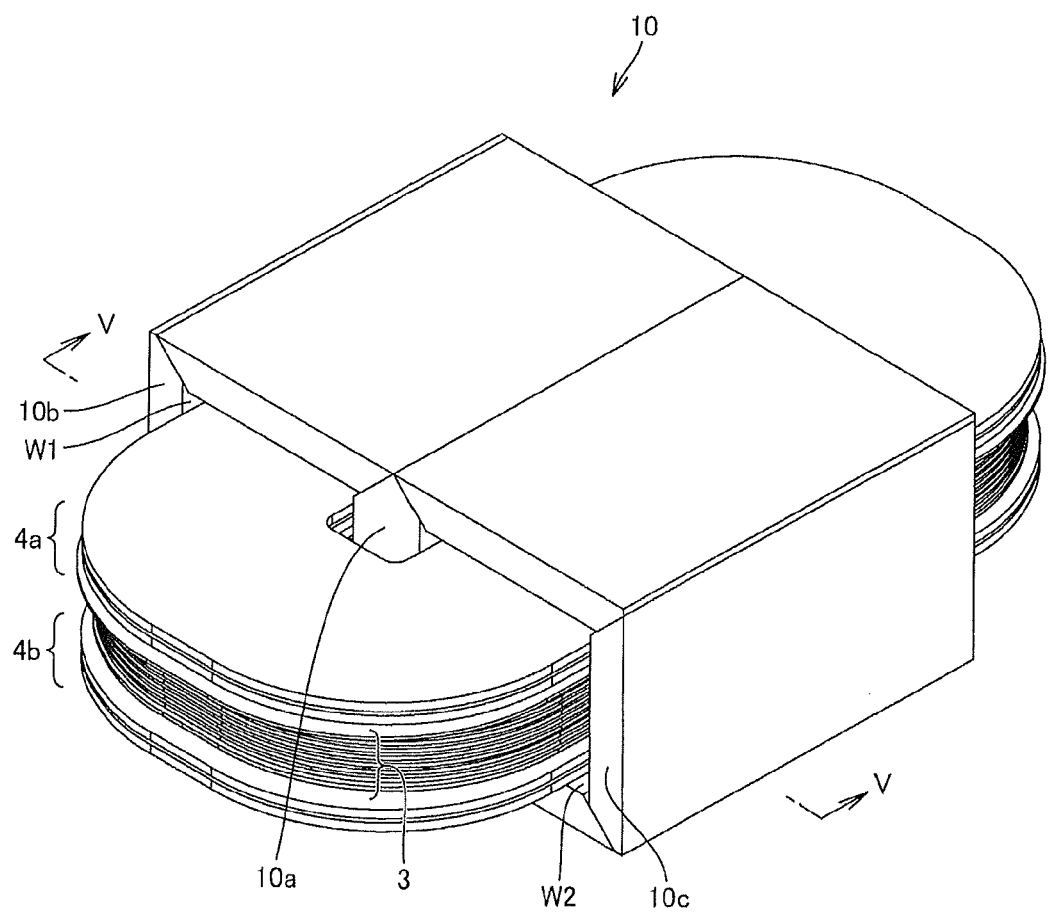
FIG. 4 is a perspective view of an iron core, a primary winding and a secondary winding shown in FIG. 1.
Figure 5:
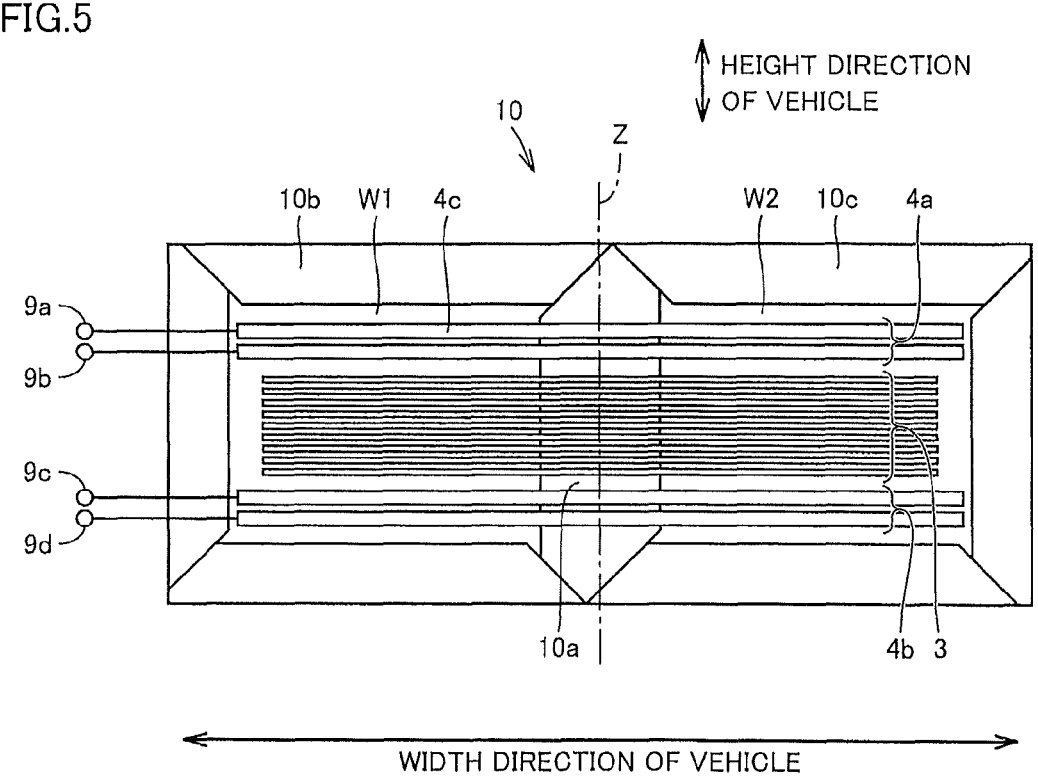
FIG. 5 is a cross sectional view taken along a V-V line in FIG. 4.

FIG. 4 is a perspective view of the iron core, the primary winding and the secondary winding shown in FIG. 1. FIG. 5 is a cross sectional view taken along a V-V line in FIG. 4. Referring to FIGS. 4 and 5, iron core 10 includes a main leg 10a and side legs 10b and 10c. Side legs 10b and 10c are connected to main leg 10a. Main leg 10a and side leg 10b form a window W1 in iron core 10. Similarly, main leg 10a and side leg 10c form a window W2 in iron core 10.

Primary winding 3 and secondary windings 4a and 4b are wound in common around main leg 10a, and passed through windows W1 and W2. In FIG. 5, the Z direction shows the direction of the axis around which primary winding 3 and secondary windings 4a and 4b are wound. Secondary winding 4a is disposed above primary winding 3 while secondary winding 4b is disposed below primary winding 3. Each of primary winding 3 and secondary windings 4a and 4b includes, for example, a planar coil 4c formed of a coil conductor (for example, made of aluminum) wound on the same plane.

FIG. 5 shows a cross section of iron core 10 in the direction that is parallel to the direction of the axis around which primary winding 3 and secondary windings 4a and 4b are wound and vertical to the direction passing through windows W1 and W2. As shown in FIG. 5, iron core 10 surrounds primary winding 3 and secondary windings 4a and 4b. In other words, the transformer according to the present embodiment is the so-called shell-type transformer.

By employing a shell-type transformer as a transformer for a railroad vehicle, a tank can be formed so as to fit into the shape of each of the iron core and the winding. This allows the volume of the tank to be decreased. The decreased volume of the tank allows further reduction in size of the transformer. Furthermore, since the volume of the tank can be decreased, the amount of the insulation oil within the tank can be reduced. Consequently, the weight of the transformer can be further reduced.

Furthermore, the direction of the axis around which planar coil 4c is wound (Z direction) corresponds to the direction of the height of the vehicle. When a plurality of planar coils 4c are stacked on main leg 10a, primary winding 3 or secondary windings 4a and 4b can be increased in the number of turns without significantly increasing the length of the winding in the height direction of the vehicle.

Each of secondary windings 4a and 4b has two terminals. Secondary winding 4a has terminals 9c and 9d while secondary winding 4b has terminals 9a and 9b. Terminals 9a to 9d each correspond to terminal 9 shown in FIG. 1. Terminals 9a to 9d are provided on the outside of iron core 10.

In the first embodiment, two terminals are provided for each secondary winding. Furthermore, the plurality of secondary windings each have two terminals that are electrically insulated from another two terminals. In other words, in the embodiment of the present invention, the terminal connected in common to the plurality of secondary windings is not employed. Therefore, the embodiment of the present invention allows reduction in size of the transformer. In this regard, an explanation will be made based on the comparison between the voltage transforming apparatus according to the first embodiment and its comparative example.

Comparative Example of the First Embodiment

Figure 6:
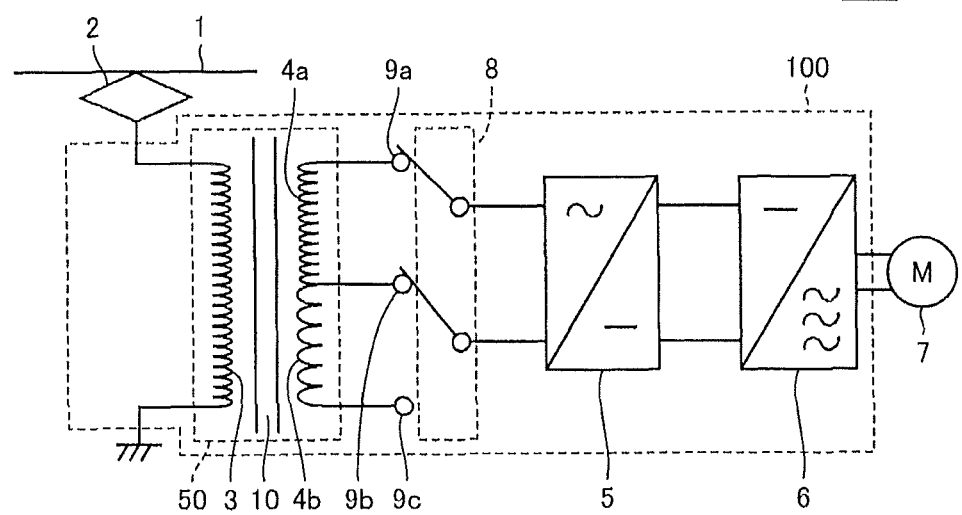
FIG. 6 is a circuit diagram showing the configuration of the railroad vehicle equipped with a transformer according to a comparative example of the first embodiment of the present invention.

FIG. 6 is a circuit diagram showing the configuration of a railroad vehicle equipped with a transformer according to a comparative example of the first embodiment of the present invention.

Referring to FIG. 6, railroad vehicle 200 is an AC electric train that runs through a plurality of sections in which AC voltages are different. Railroad vehicle 200 includes a pantograph 2, a voltage transforming apparatus 100 and a motor 7. Voltage transforming apparatus 100 includes a transformer 50, a converter 5, an inverter 6, and a switching circuit 8. Transformer 50 includes primary winding 3, secondary windings 4a and 4b, and iron core 10.

Pantograph 2 is connected to an overhead wire 1. Primary winding 3 has the first terminal connected to pantograph 2 and the second terminal provided on the side opposite to the first terminal and connected to the ground node to which a ground voltage is supplied.

Secondary winding 4a is magnetically coupled to primary winding 3, and has terminal 9a provided at one end of secondary winding 4a and terminal 9b provided at the other end of secondary winding 4a. Secondary winding 4b is magnetically coupled to primary winding 3, and has terminal 9b provided at one end of secondary winding 4b and terminal 9c provided at the other end of secondary winding 4b. In other words, terminal 9b is shared by secondary windings 4a and 4b. It is to be noted that secondary windings 4a and 4b are different in number of turns.

Switching circuit 8 selectively connects secondary windings 4a and 4b to converter 5. In other words, switching circuit 8 switches between connection of terminals 9a and 9b of secondary winding 4a to the first input terminal and the second input terminal, respectively, of converter 5 and connection of terminals 9b and 9c of secondary winding 4b to the first input terminal and the second input terminal, respectively, of converter 5.

The single-phase AC voltage supplied from overhead wire 1 is supplied through pantograph 2 to primary winding 3. The AC voltage supplied to primary winding 3 induces an AC voltage in each of secondary windings 4a and 4b.

Converter 5 converts, into a direct-current (DC) voltage, the AC voltage induced in secondary winding 4a or secondary winding 4b connected to converter 5 by switching circuit 8.

Inverter 6 converts the DC voltage supplied from converter 5 into a three-phase AC voltage, and outputs the voltage to motor 7. Motor 7 is then driven by the three-phase AC voltage supplied from inverter 6.

Figure 7:
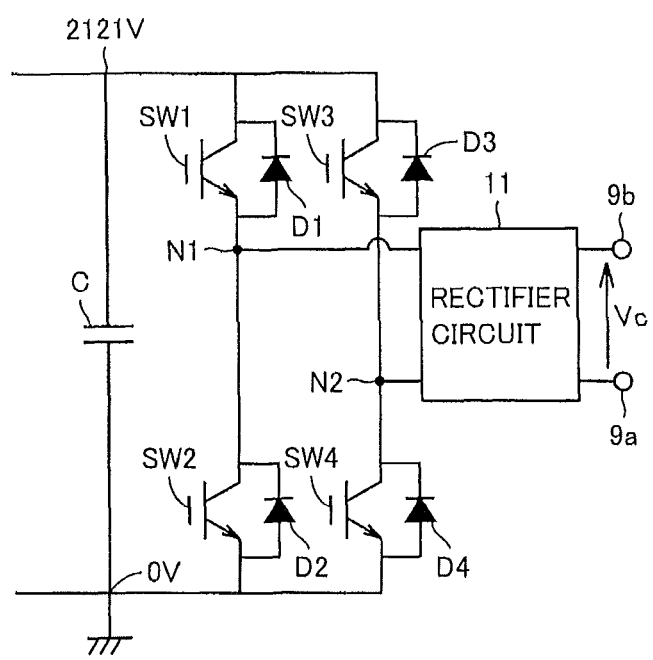
FIG. 7 is a circuit diagram of a converter shown in FIG. 6.

FIG. 7 is a circuit diagram of the converter shown in FIG. 6. FIG. 7 representatively shows the state where terminals 9a and 9b of secondary winding 4a are connected to converter 5.

Referring to FIG. 7, converter 5 includes a rectifier circuit 11, switch elements SW1 to SW4, diodes D1 to D4, and a capacitor C. Switch elements SW1 to SW4 are connected between the ground node and switching circuit 8. The first and second terminals of each of secondary windings 4a and 4b are connected to the ground node through switching circuit 8 and switch elements SW1 to SW4.

More specifically, each of switch elements SW1 to SW4 is, for example, a semiconductor switch element such as a thyristor and an IGBT (Insulated Gate Bipolar Transistor). Switch element SW1 has one end connected to the first end of capacitor C, the other end connected to a node N1, and a gate. Switch element SW2 has one end connected to node N1, the other end connected to the second end of capacitor C, and a gate. Switch element SW3 has one end connected to the first end of capacitor C, the other end connected to a node N2, and a gate. Switch element SW4 has one end connected to node N2, the other end connected to the second end of capacitor C, and a gate.

Diode D1 has a cathode connected to one end of switch element SW1 and an anode connected to the other end (node N1) of switch element SW1. Diode D2 has a cathode connected to one end (node N1) of switch element SW2 and an anode connected to the other end of switch element SW2. Diode D3 has a cathode connected to one end of switch element SW3 and an anode connected to the other end (node N2) of switch element SW3. Diode D4 has a cathode connected to one end (node N2) of switch element SW4 and an anode connected to the other end of switch element SW4.

Converter 5 is a single-ended ground type converter in which capacitor C has one end, for example, the second end, connected to the ground node.

Rectifier circuit 11 is connected to nodes N1 and N2. Rectifier circuit 11 rectifies the AC voltage induced in secondary winding 4a or secondary winding 4b.

Switch elements SW1 to SW4 turn on/off based on the control signal received at each gate, to thereby convert the voltage rectified by rectifier circuit 11 into a DC voltage. Capacitor C smoothes the DC voltage converted by switch elements SW1 to SW4.

The operation of a voltage transforming apparatus 100 will then be described. In this case, the explanation will be made assuming that the number of turns of primary winding 3 is 1000 T, the number of turns of secondary winding 4a is 100 T, and the number of turns of secondary winding 4b is 60 T.

Figure 8:
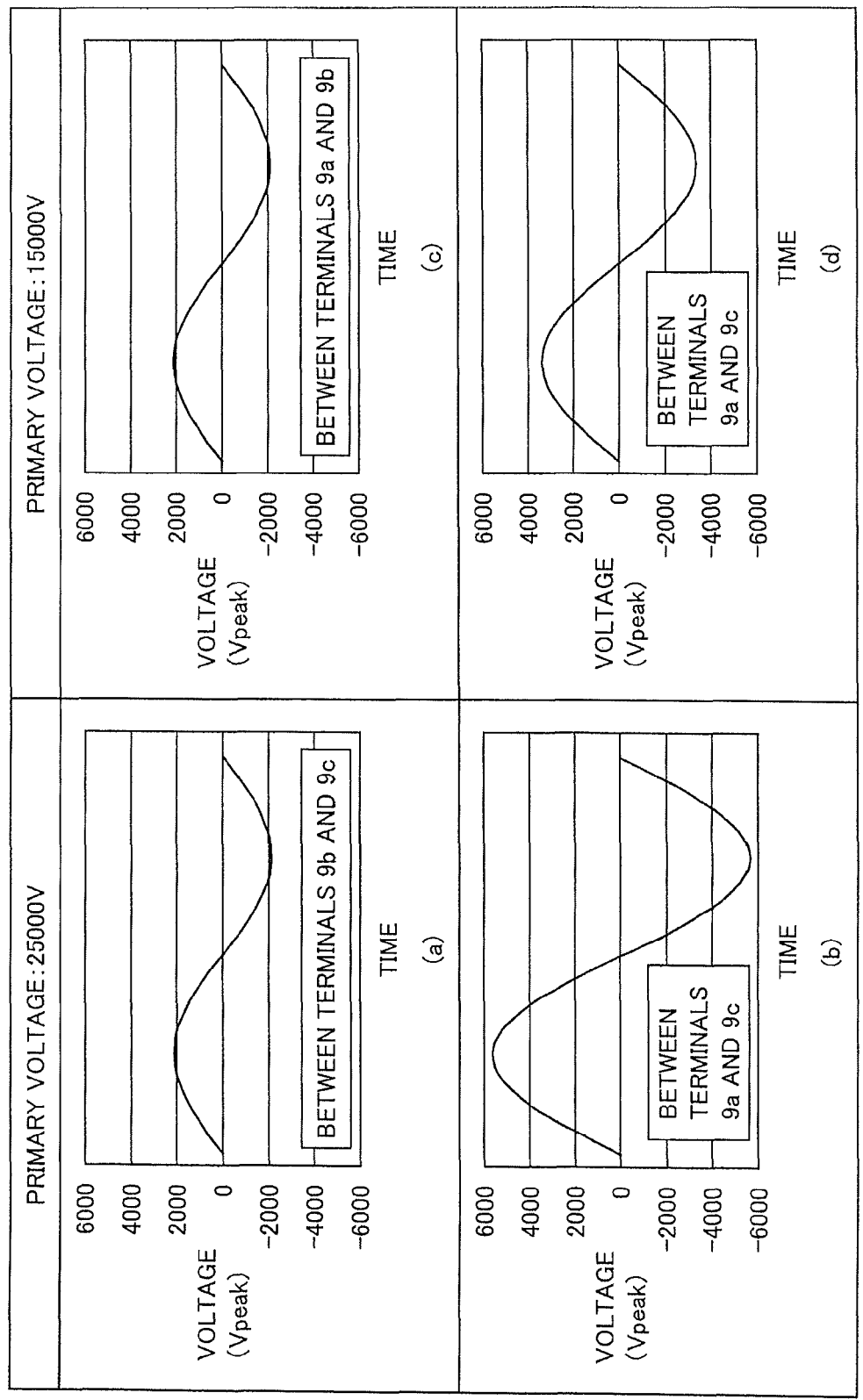
FIG. 8 is a diagram showing a voltage between the terminals in the secondary winding for each type of the primary voltage.

FIG. 8 is a diagram showing a voltage between the terminals in the secondary winding for each type of the primary voltage. Referring to FIGS. 6 and 8, when the effective value of the primary voltage, that is, the AC voltage received by primary winding 3, is 25000V, secondary winding 4b is connected to converter 5 by switching circuit 8 in voltage transforming apparatus 100.

In secondary winding 4b, a voltage represented by an equation of 25000V/1000 T×60 T=1500V is generated. In other words, an AC voltage having an effective value of 1500V is induced between terminals 9b and 9c. The voltage between terminals 9b and 9c (zero peak value) is 2121V (FIG. 8(a)).

Also in secondary winding 4a that is not used, a voltage in accordance with the turns ratio between primary winding 3 and secondary winding 4a is generated. In secondary winding 4a, a voltage represented by an equation of 25000V/1000 T×(100 T+60 T)=4000V is generated. In other words, an AC voltage having an effective value of 4000V is induced between terminals 9a and 9c. The voltage between terminals 9a and 9c (zero peak value) is 5657V (FIG. 8(b)).

On the other hand, when the effective value of the primary voltage, that is, the AC voltage received by primary winding 3, is 15000V, secondary winding 4a is connected to converter 5 by switching circuit 8 in voltage transforming apparatus 100.

In secondary winding 4a, a voltage represented by an equation of 15000V/1000 T×100 T=1500V is generated. In other words, an AC voltage having an effective value of 1500V is induced between terminals 9a and 9b. The voltage between terminals 9a and 9b (zero peak value) is 2121V (FIG. 8(c)).

Also in secondary winding 4b that is not used, a voltage in accordance with the turns ratio between primary winding 3 and secondary winding 4b is generated. In secondary winding 4b, a voltage represented by an equation of 15000V/1000 T×(60 T+100 T)=2400V is generated. In other words, an AC voltage having an effective value of 2400V is induced between terminals 9a and 9c. The voltage between terminals 9a and 9c (zero peak value) is 3394V (FIG. 8(d)).

Figure 9:
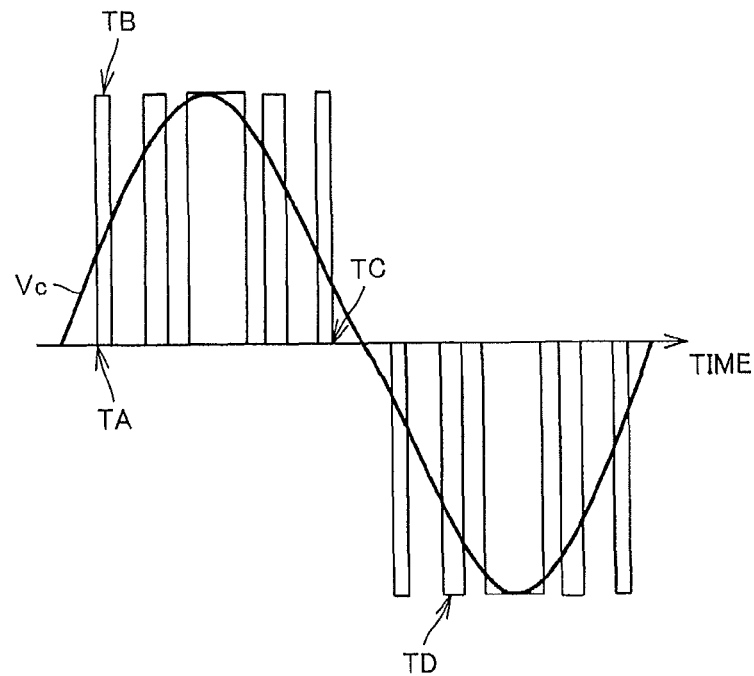
FIG. 9 is a waveform diagram for illustrating the operation of the converter shown in FIG. 7.

FIG. 9 is a waveform diagram for illustrating the operation of the converter shown in FIG. 7. FIGS. 10 to 13 each are a diagram showing a voltage generated in the low-voltage side winding (secondary winding) and a current generated in the converter at each timing shown in FIG. 9. Also, FIGS. 10 to 13 each show the voltage and the current that are generated in transformer 51 described later.

Referring to FIG. 9, a voltage Vc shows a voltage between terminals 9a and 9b. FIG. 9 also shows a voltage pulse waveform obtained by switching (ON/OFF) of switch elements SW1 to SW4.

Converter 5 has the first input terminal and the second input terminal connected through switching circuit 8 to the first terminal and the second terminals, respectively, of each of secondary windings 4a and 4b. Converter 5 operates so as to alternately connect the first input terminal and the second input terminal to the fixed potential node through switch elements SW1 to SW4.

Figure 10:
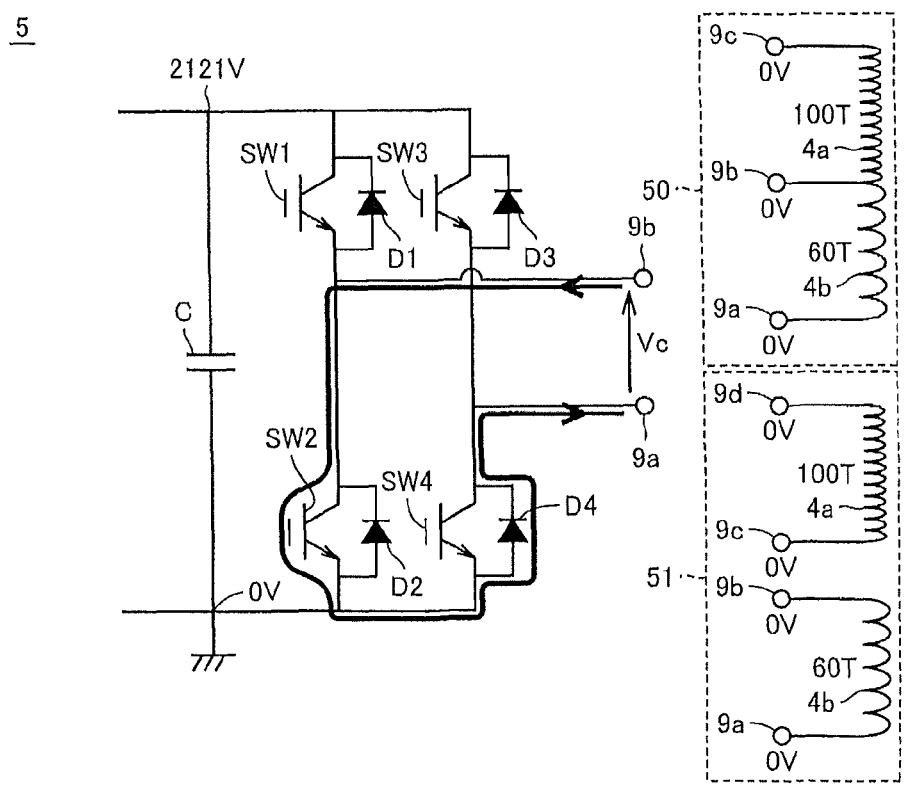
FIG. 10 is a diagram showing a voltage generated in the low-voltage side winding (secondary winding) and a current generated in the converter at a timing TA shown in FIG. 9.

Referring to FIGS. 9 and 10, at a timing TA shown in FIG. 9, switch element SW1 turns off, switch element SW2 turns on, switch element SW3 turns off, and switch element SW4 turns off. This causes the current to flow through converter 5 as shown by an arrow in FIG. 10, in which case the voltage at each of terminals 9a and 9b is 0V. At this time, the voltage at terminal 9c is also 0V.

Figure 11:
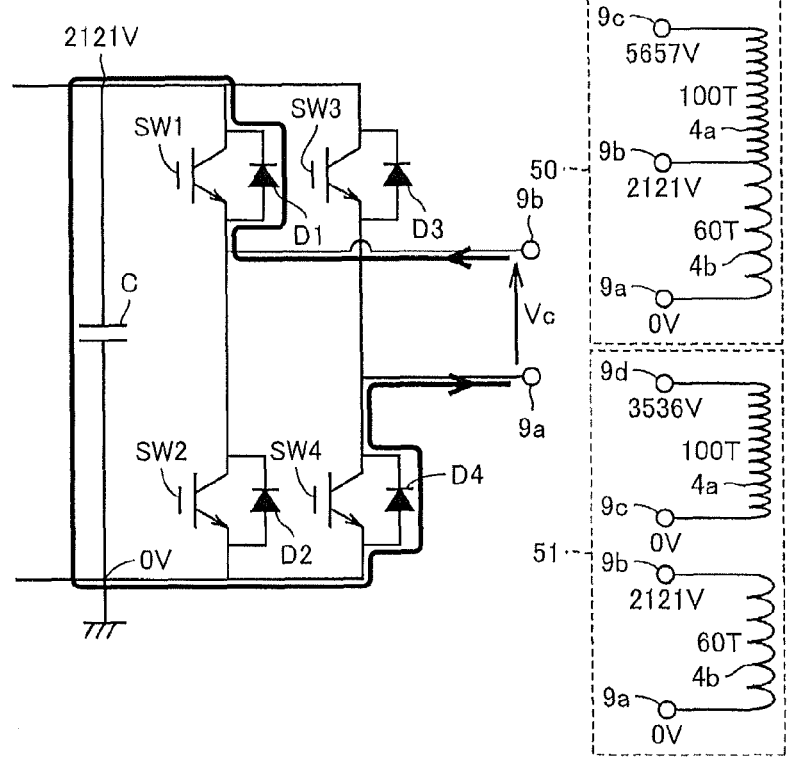
FIG. 11 is a diagram showing a voltage generated in the low-voltage side winding (secondary winding) and a current generated in the converter at a timing TB shown in FIG. 9.

Referring to FIGS. 9 and 11, at a timing TB shown in FIG. 9, switch element SW1 turns off, switch element SW2 turns off, switch element SW3 turns off, and switch element SW4 turns off. This causes the current to flow through converter 5 as shown by an arrow in FIG. 11, in which case the voltage at terminal 9a is 0V while the voltage at terminal 9b is 2121V. At this time, the voltage at terminal 9c is represented by an equation of 2121V×(100+60)T/60 T=5657V.

Figure 12:
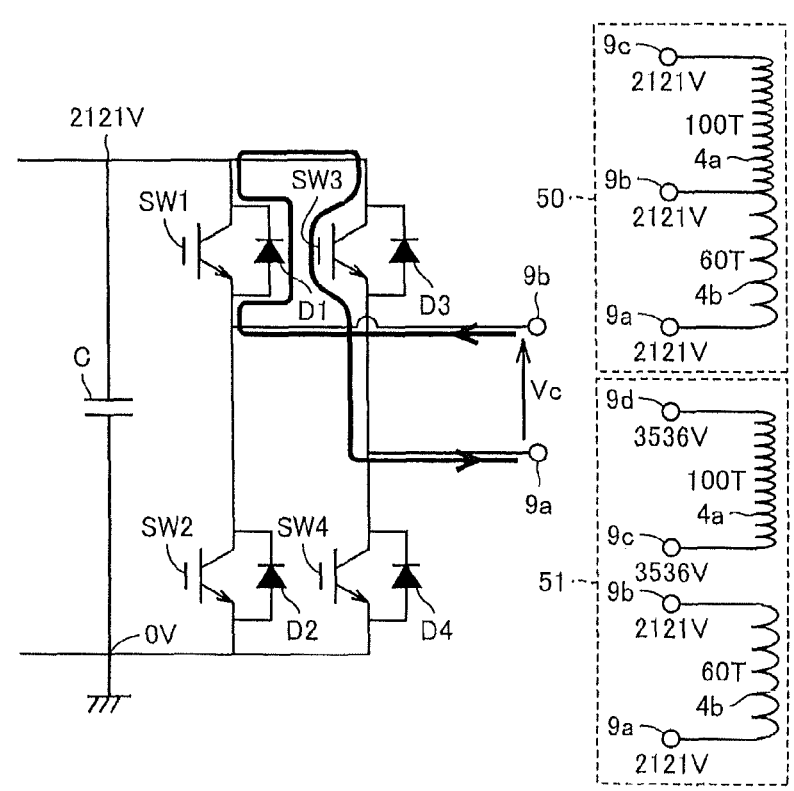
FIG. 12 is a diagram showing a voltage generated in the low-voltage side winding (secondary winding) and a current generated in the converter at each timing TC shown in FIG. 9.

Referring to FIGS. 9 and 12, at a timing TC shown in FIG. 9, switch element SW1 turns off, switch element SW2 turns off, switch element SW3 turns on, and switch element SW4 turns off. This causes the current to flow through converter 5 as shown by an arrow in FIG. 12, in which case the voltage at terminal 9a is 2121V while the voltage at terminal 9b is 2121V. At this time, the voltage at terminal 9c is also 2121V.

Figure 13:
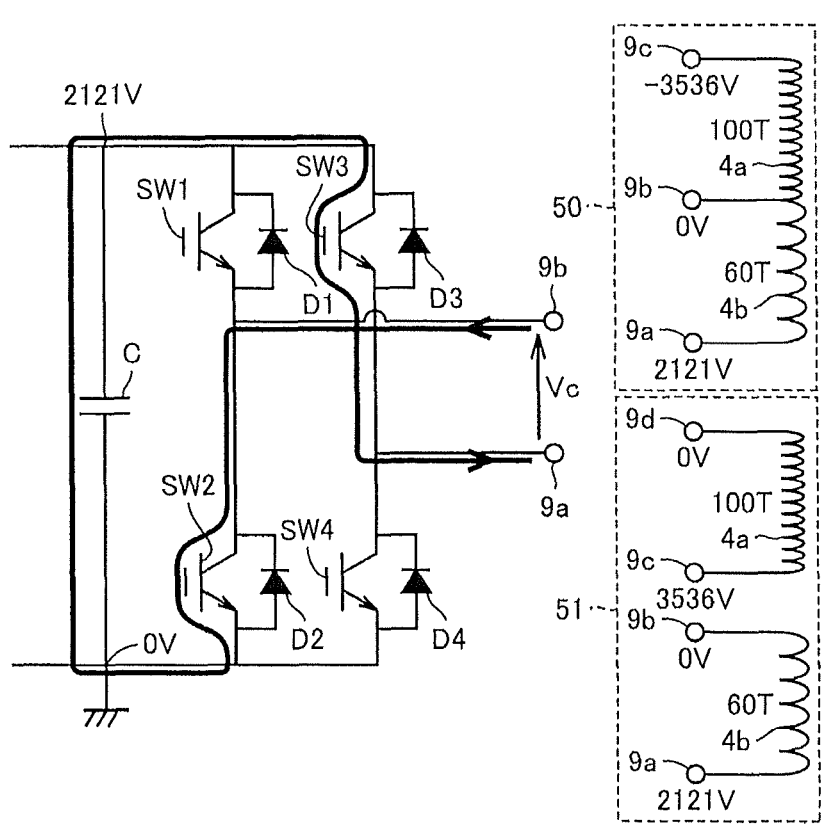
FIG. 13 is a diagram showing a voltage generated in the low-voltage side winding (secondary winding) and a current generated in the converter at each timing TD shown in FIG. 9.

Referring to FIGS. 9 and 13, at a timing TD shown in FIG. 9, switch element SW1 turns off, switch element SW2 turns on, switch element SW3 turns on, and switch element SW4 turns off. This causes the current to flow through converter 5 as shown by an arrow in FIG. 13, in which case the voltage at terminal 9a is 2121V while the voltage at terminal 9b is 0V. At this time, the voltage at terminal 9c is −3536V.

As described above, in voltage transforming apparatus 100, a voltage of up to 5657V is generated at the terminal of the secondary winding that is not used (see FIG. 11). Accordingly, it becomes necessary to increase an insulation size such as a distance between the winding and the iron core.

Figure 14:
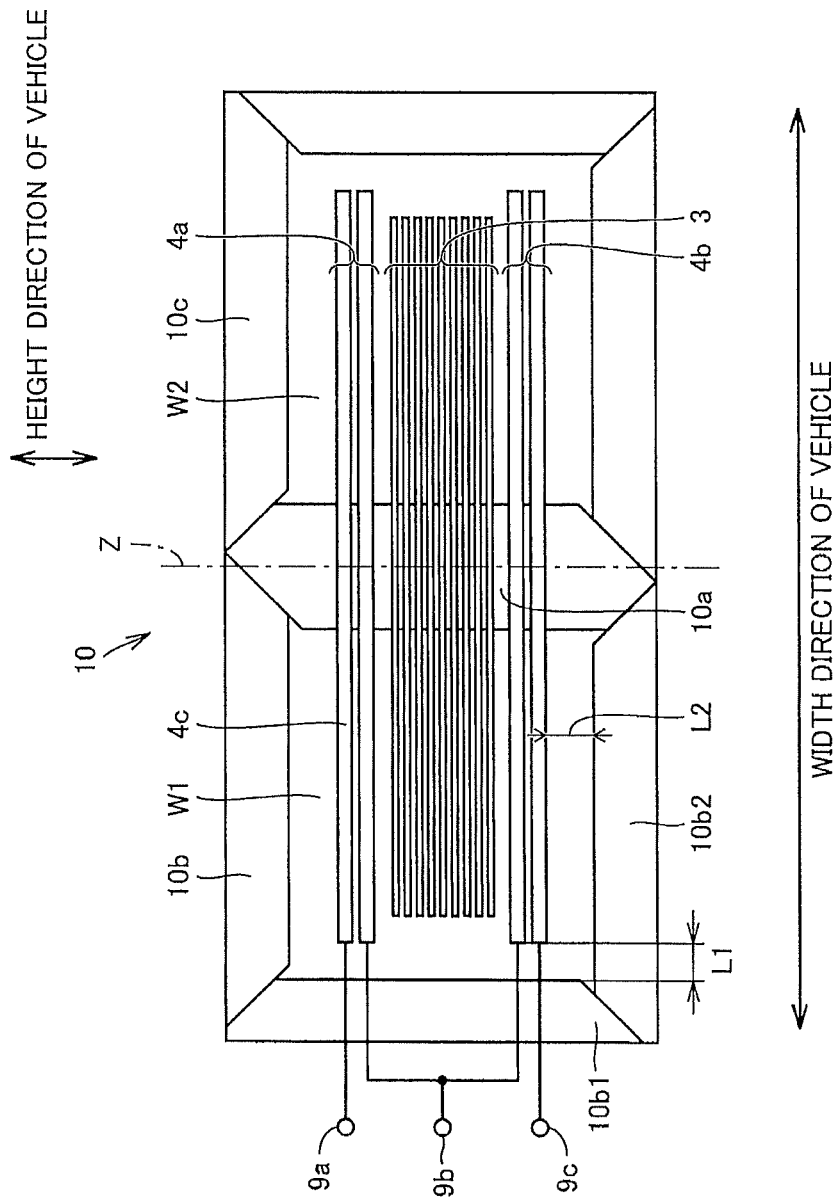
FIG. 14 is a schematic cross sectional view of an iron core, a primary winding and a secondary winding of a transformer 50.

FIG. 14 is a schematic cross sectional view of the iron core, the primary winding and the secondary winding of transformer 50. FIG. 14 is a diagram compared with FIG. 4. Referring to FIG. 14, the potential of iron core 10 is 0(V). Secondary winding 4a is disposed above primary winding 3 while secondary winding 4b is disposed below primary winding 3. The voltage applied to primary winding 3 is higher than the voltage induced in secondary windings 4a and 4b. The secondary winding is disposed between primary winding 3 and iron core 10, thereby allowing a gradual change in the voltage in the direction of the axis around which the windings are wound (Z direction). Furthermore, the distance between primary winding 3 and iron core 10 is greater than the distance between secondary winding (4a, 4b) and iron core 10 in the horizontal direction with respect to the iron core. Consequently, the insulation distance between primary winding 3 and iron core 10 is ensured.

However, as shown in FIG. 11, a voltage of up to 5657V is generated at terminal 9c. This requires an increase in the distance between the end of secondary winding 4b connected to terminal 9c and iron core 10. According to the configuration shown in FIG. 14, it is necessary to increase the distance (length L1) between a leg 10b1 corresponding to a part of side leg 10b and secondary winding 4b, or the distance (length L2) between a leg 10b2 corresponding to a part of side leg 10b and secondary winding 4b. When the number of turns of the secondary winding is decreased, the secondary winding is reduced in size. Accordingly, the insulation distance between iron core 10 and the secondary winding (4a, 4b) can be increased. However, due to a change in the turns ratio, it becomes difficult to extract a desirable voltage from the secondary winding. On the other hand, when iron core 10 is increased in size in order to increase the insulation distance between iron core 10 and the secondary winding (4a, 4b), the transformer is increased in size. This makes it difficult to achieve reduction in size and weight of the transformer.

Thus, in a voltage transforming apparatus 101 according to the embodiment of the present invention, the above-described problems are solved by the structure of the secondary winding. In addition, the same or equivalent components of voltage transforming apparatus 101 that correspond to those of voltage transforming apparatus 100 are designated by the same reference characters, and description thereof will not be repeated.

Figure 15:
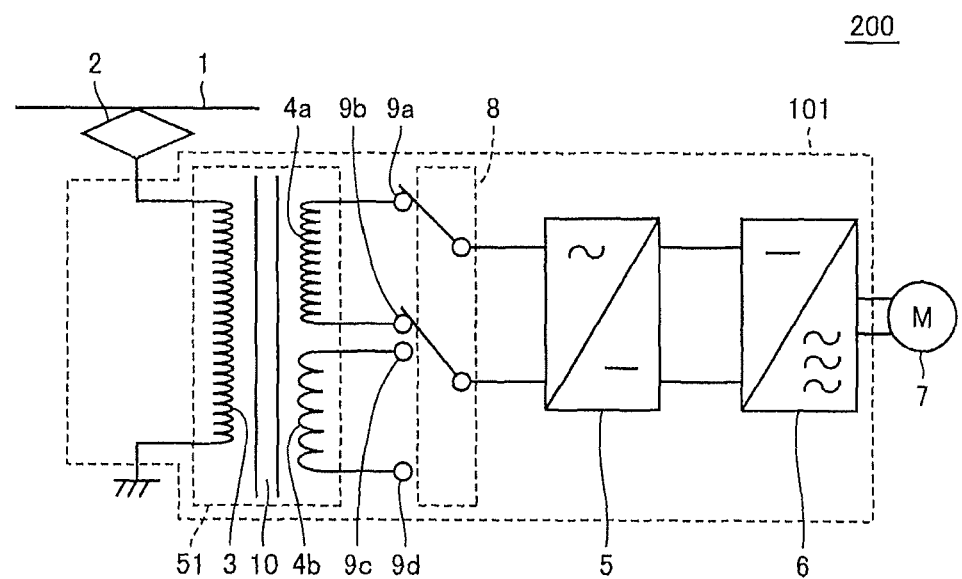
FIG. 15 is a diagram showing the configuration of the railroad vehicle according to the first embodiment of the present invention.

FIG. 15 is a diagram showing the configuration of the railroad vehicle according to the first embodiment of the present invention. Referring to FIG. 15, railroad vehicle 200 is an AC electric train that runs through a plurality of sections in which AC voltages are different. Railroad vehicle 200 includes pantograph 2, voltage transforming apparatus 101 and motor 7. Voltage transforming apparatus 101 includes transformer 51, converter 5, inverter 6, and switching circuit 8. Transformer 51 includes primary winding 3, secondary windings 4a and 4b, and iron core 10.

Each of secondary windings 4a and 4b has separate first and second terminals at which potentials are not fixed. More specifically, secondary winding 4a is magnetically coupled to primary winding 3, and has terminal 9a provided at one end of secondary winding 4a and terminal 9b provided at the other end of secondary winding 4a. Secondary winding 4b is magnetically coupled to primary winding 3, and has terminal 9c provided at one end of secondary winding 4b and terminal 9d provided at the other end of secondary winding 4b. Secondary windings 4a and 4b are different in number of turns.

Switching circuit 8 selectively connects secondary windings 4a and 4b to converter 5. In other words, switching circuit 8 selectively connects the first and second terminals of each of secondary windings 4a and 4b to converter 5. More specifically, switching circuit 8 switches between connection of terminals 9a and 9b of secondary winding 4a to the first input terminal and the second input terminal, respectively, of converter 5, and connection of terminals 9c and 9d of secondary winding 4b to the first input terminal and the second input terminal, respectively, of converter 5.

The operation of voltage transforming apparatus 101 will then be described. In this case, the explanation will be made assuming that the number of turns of primary winding 3 is 1000 T, the number of turns of secondary winding 4a is 100 T, and the number of turns of secondary winding 4b is 60 T. It is to be noted that these numbers of turns do not limit the present invention.

Figure 16:
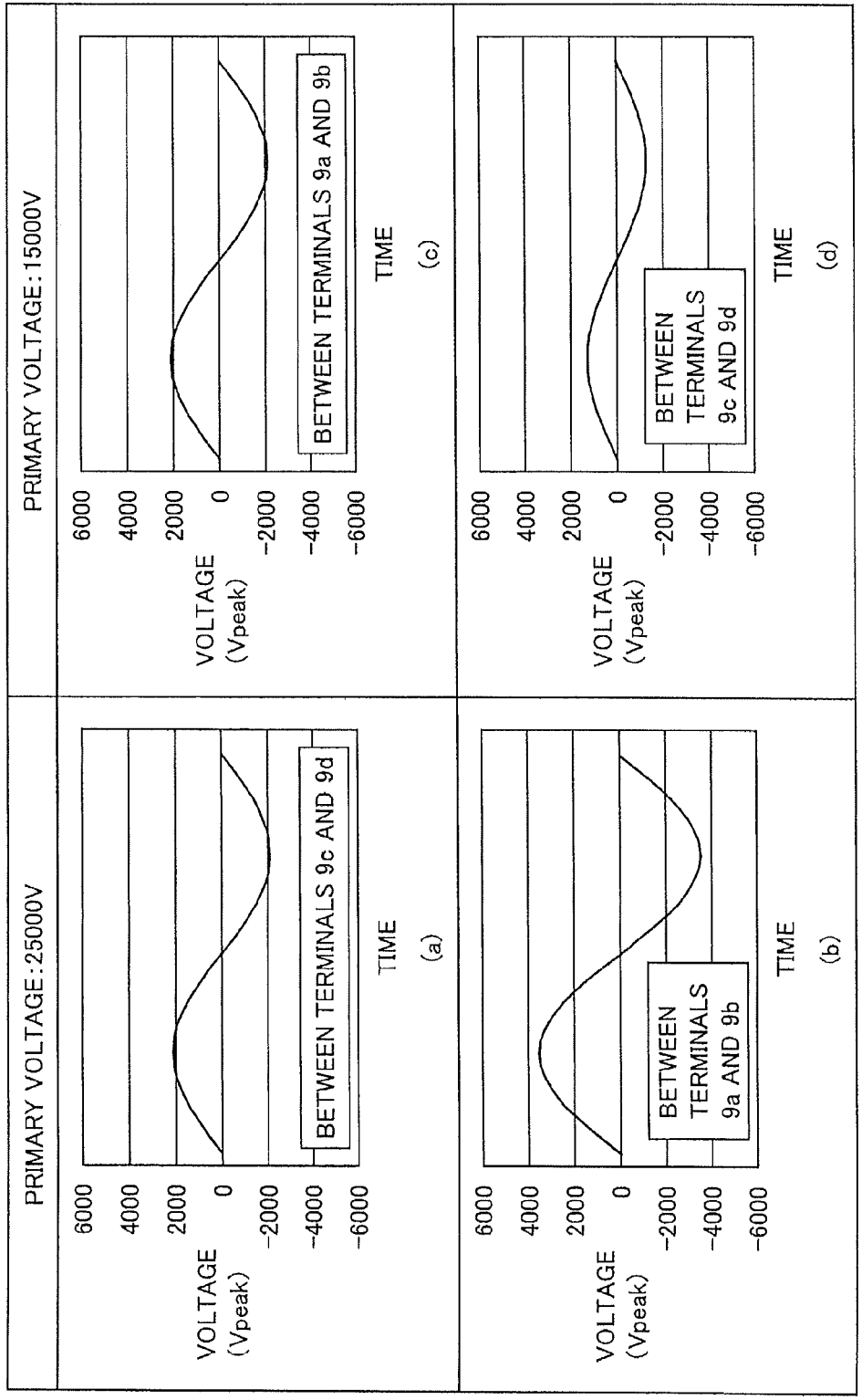
FIG. 16 is a diagram showing the voltage between the terminals of the secondary winding for each type of the primary voltage.

FIG. 16 is a diagram showing the voltage between the terminals of the secondary winding for each type of the primary voltage. Referring to FIGS. 15 and 16, when the effective value of the primary voltage, that is, the AC voltage received by primary winding 3, is 25000V, secondary winding 4b is connected to converter 5 by switching circuit 8 in voltage transforming apparatus 101.

In secondary winding 4b, a voltage represented by an equation of 25000V/1000 T×60 T=1500V is generated. In other words, an AC voltage having an effective value of 1500V is induced between terminals 9c and 9d. The voltage between terminals 9c and 9d (zero peak value) is 2121V (FIG. 16(a)).

Also in secondary winding 4a that is not used, a voltage in accordance with the turns ratio between primary winding 3 and secondary winding 4a is generated. However, since terminal 9b of secondary winding 4a and terminal 9c of secondary winding 4b are separately provided in voltage transforming apparatus 101, only a voltage represented by an equation of 25000V/1000 T×100 T=2500V is generated in secondary winding 4a. In other words, an AC voltage having an effective value of 2500V is induced between terminals 9a and 9b. The voltage between terminals 9a and 9b (zero peak value) is 3536V (FIG. 16(b)).

On the other hand, when the effective value of the primary voltage, that is, the AC voltage received by primary winding 3, is 15000V, secondary winding 4a is connected to converter 5 by switching circuit 8 in voltage transforming apparatus 101.

In secondary winding 4a, a voltage represented by an equation of 15000V/1000 T×100 T=1500V is generated. In other words, an AC voltage having an effective value of 1500V is induced between terminals 9a and 9b. The voltage between terminals 9a and 9b (zero peak value) is 2121V (FIG. 16(c)).

Also in secondary winding 4b that is not used, a voltage in accordance with the turns ratio between primary winding 3 and secondary winding 4b is generated. However, since terminal 9b of secondary winding 4a and terminal 9c of secondary winding 4b are separately provided in voltage transforming apparatus 101, only a voltage represented by an equation of 15000V/1000 T×60 T=900V is generated in secondary winding 4a. In other words, an AC voltage having an effective value of 900V is induced between terminals 9c and 9d. The voltage between terminals 9c and 9d (zero peak value) is 1273V (FIG. 16(d)).

Then, the voltage and the current generated in transformer 51 will be described. It is to be noted that the operation waveform of converter 5 is identical to that shown in FIG. 9 while the operation of each of switch elements SW1 to SW4 constituting converter 5 is identical to the operation illustrated in each of FIGS. 10 to 13. In the following, an explanation will be representatively given with regard to the operation of transformer 51 in the state where terminals 9a and 9b of secondary winding 4a are connected to converter 5.

Referring to FIGS. 9 and 10, at timing TA shown in FIG. 9, switch element SW1 turns off, switch element SW2 turns on, switch element SW3 turns off, and switch element SW4 turns off. This causes the current to flow through converter 5 as shown by an arrow in FIG. 10, in which case the voltage at each of terminals 9a and 9b is 0V. At this time, the voltage at terminal 9c is also 0V.

Referring to FIGS. 9 and 11, at timing TB shown in FIG. 9, switch element SW1 turns off, switch element SW2 turns off, switch element SW3 turns off, and switch element SW4 turns off. This causes the current to flow through converter 5 as shown by an arrow in FIG. 11, in which case the voltage at terminal 9a is 0V while the voltage at terminal 9b is 2121V. At this time, the voltage at terminal 9c is 0V while the voltage at terminal 9d is represented by an equation of 2121V×100 T/60 T=3536V. In the case of transformer 50, a voltage having a magnitude of 5657V is generated at unused terminal 9c. In the case of transformer 51, a voltage having a magnitude of 3536V is generated at unused terminal 9d.

Referring to FIGS. 9 and 12, at timing TC shown in FIG. 9, switch element SW1 turns off, switch element SW2 turns off, switch element SW3 turns on, and switch element SW4 turns off. This causes the current to flow as shown by an arrow in FIG. 12, in which case the voltage at terminal 9a is 2121V while the voltage at terminal 9b is 2121V. At this time, the voltage at terminal 9c is 3536V while the voltage at terminal 9d is 3536V.

Referring to FIGS. 9 and 13, at timing TD shown in FIG. 9, switch element SW1 turns off, switch element SW2 turns on, switch element SW3 turns on, and switch element SW4 turns off. This causes the current to flow through converter 5 as shown by an arrow in FIG. 13, in which case the voltage at terminal 9a is 2121V while the voltage at terminal 9b is 0V. At this time, the voltage at terminal 9c is 3536V while the voltage at terminal 9d is 0V.

Figure 17:
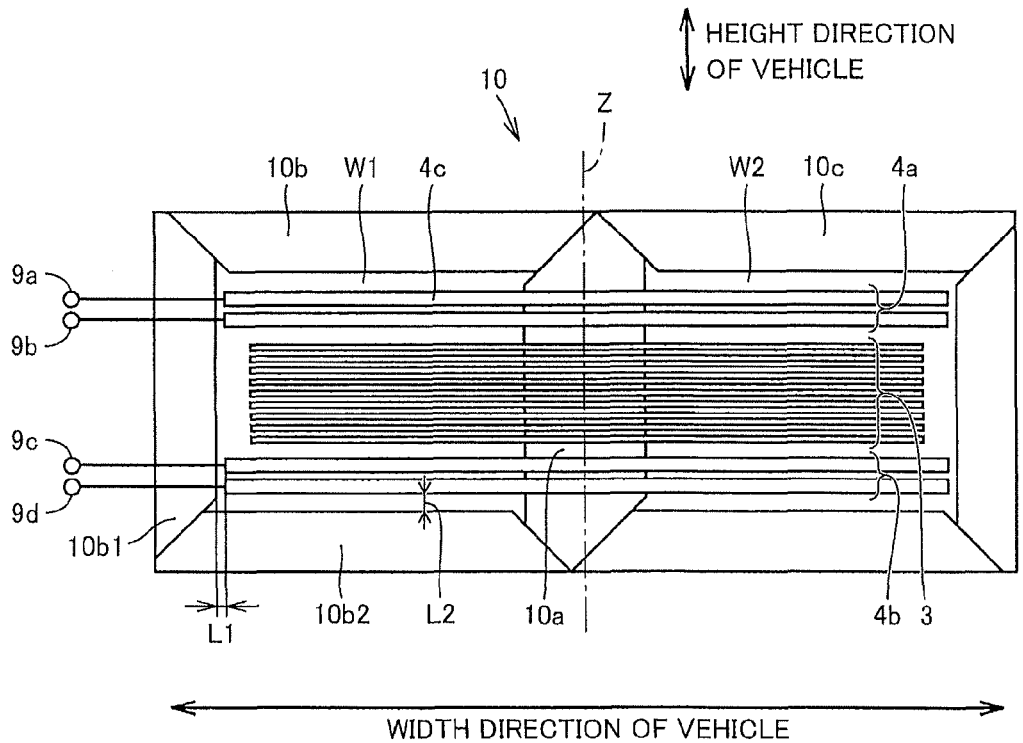
FIG. 17 is a diagram for illustrating the insulation distance between an iron core and a secondary winding in the case of a transformer 51 according to the first embodiment of the present invention.
Figure 18:
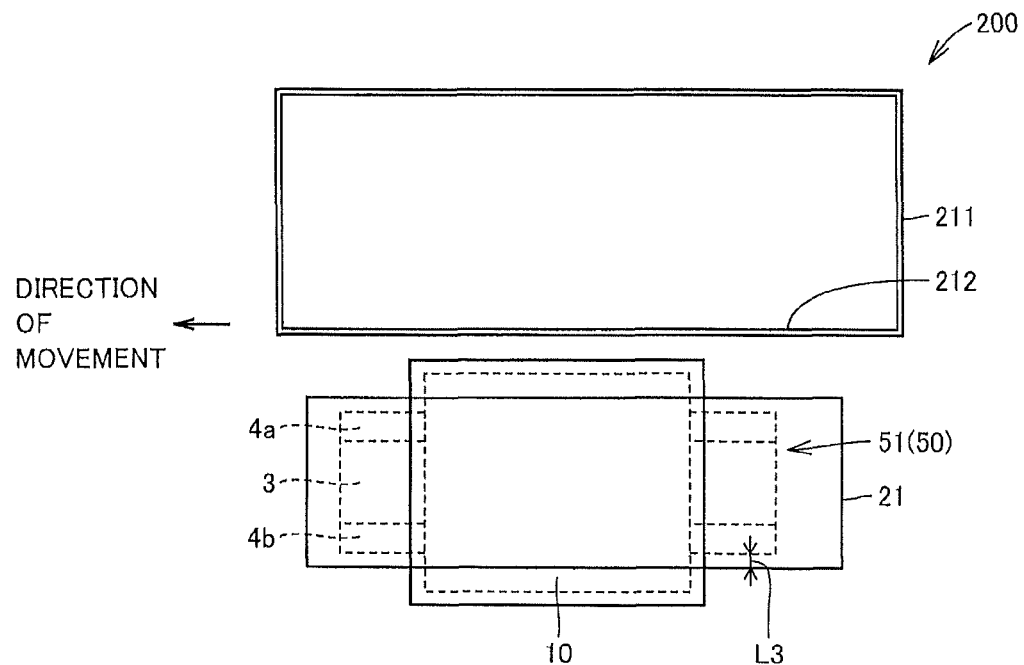
FIG. 18 is a diagram for illustrating the insulation distance between a tank and the secondary winding in the case of transformer 51 according to the first embodiment of the present invention.

FIG. 17 is a diagram for illustrating the insulation distance between the iron core and the secondary winding in the case of transformer 51 according to the first embodiment of the present invention. FIG. 18 is a diagram for illustrating the insulation distance between the tank and the secondary winding in the case of transformer 51 according to the first embodiment of the present invention.

Referring to FIGS. 17 and 18, according to the first embodiment, the voltage generated at terminal 9d, that is, the voltage generated at unused terminal 9d, is 3536V at the maximum. Accordingly, the insulation distance between the secondary winding and iron core 10 can be defined shorter than the insulation distance in the case of transformer 50. In other words, lengths L1 and L2 can be shortened as compared with the case of transformer 50. Therefore, the space within iron core 10 (windows W1 and W2) can be reduced, so that iron core 10 can also be reduced in size.

Furthermore, the potential of tank 21 is also 0V as with the potential of the iron core. The size of tank 21 depends on the insulation distance from secondary windings 4a and 4b to tank 21. As described above, in the first embodiment of the present invention, the voltage generated at unused terminal 9d can be decreased. Consequently, the insulation distance between tank 21 and the secondary winding can also be shortened. This allows a decrease in size of the tank, so that the transformer can be reduced in size and weight.

As described above, the potential of each of secondary windings 4a and 4b is not fixed in voltage transforming apparatus 100 and voltage transforming apparatus 101. This configuration is specific to the transformer mounted in the AC electric train. Generally, the secondary winding has one terminal connected to the ground potential.

Figure 19:
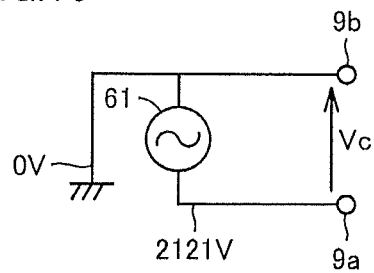
FIG. 19 is a circuit diagram showing the configuration of a general AC power supply.

FIG. 19 is a circuit diagram showing the configuration of a general AC power supply. FIG. 19 representatively shows terminals 9a and 9b of secondary winding 4a. Referring to FIG. 19, the transformer included in an AC power supply 61 employs a single-ended ground system. In other words, in the case where AC power supply 61 includes transformer 50, for example, terminal 9b is connected to the ground potential. Furthermore, in the case where AC power supply 61 includes transformer 51, for example, terminal 9b of secondary winding 4a and terminal 9d of secondary winding 4b are connected to the ground potential.

The operation of AC power supply 61 will then be described. In this case, the explanation will be made assuming that, in the transformer of AC power supply 61, the number of turns of primary winding 3 is 1000 T, the number of turns of secondary winding 4a is 100 T, and the number of turns of secondary winding 4b is 60 T.

Figure 20:
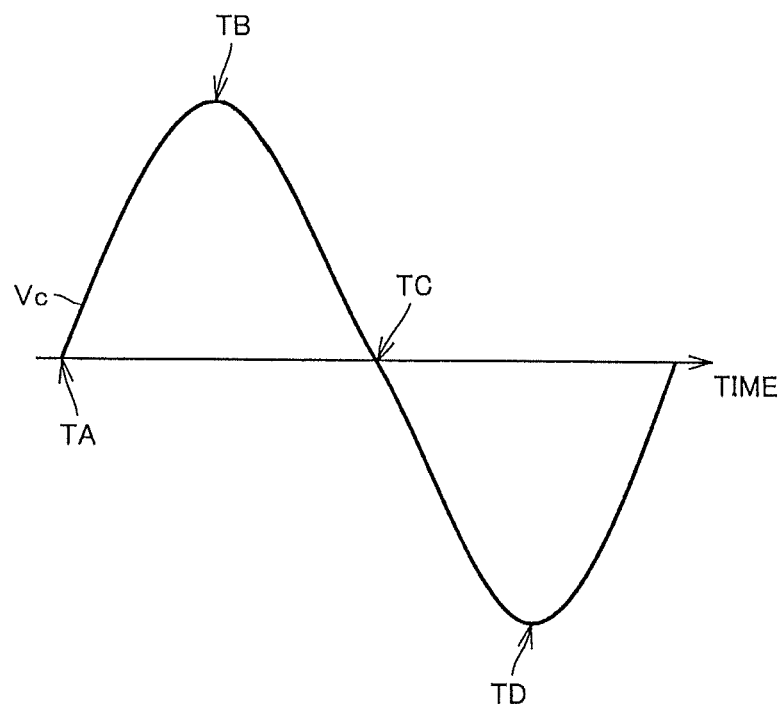
FIG. 20 is a waveform diagram showing the operation of the AC power supply shown in FIG. 19.

FIG. 20 is a waveform diagram showing the operation of the AC power supply shown in FIG. 19. FIGS. 21 to 24 each are a diagram showing the voltage generated in the secondary winding at each timing shown in FIG. 20.

Figure 21:
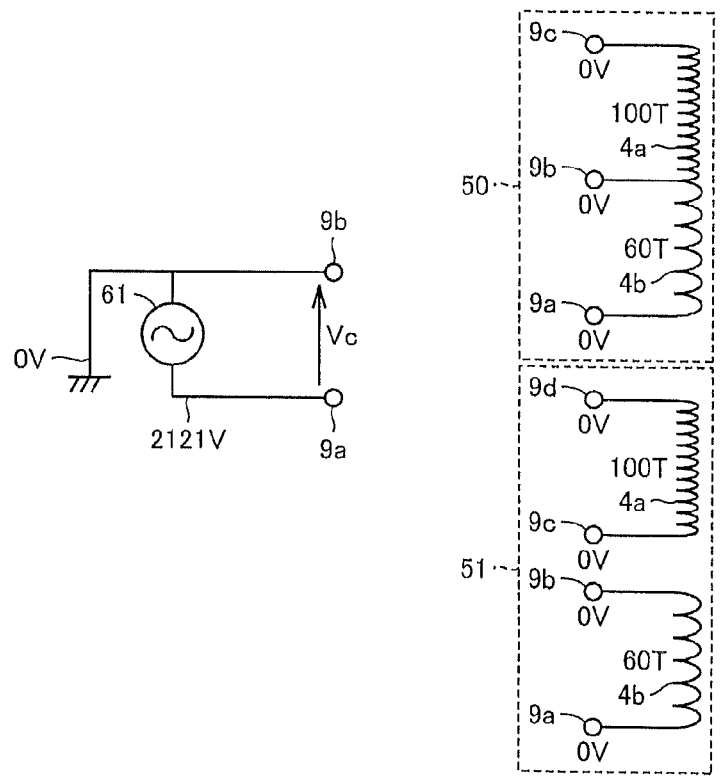
FIG. 21 is a diagram showing a voltage generated in the secondary winding at a timing TA shown in FIG. 20.

Referring to FIG. 20, voltage Vc shows a voltage between terminals 9a and 9b. Referring to FIGS. 20 and 21, at timing TA shown in FIG. 20, each voltage at terminals 9a, 9b and 9c is 0V in transformer 50. Similarly, in transformer 51, each voltage at terminals 9a, 9b, 9c, and 9d is 0V.

Figure 22:
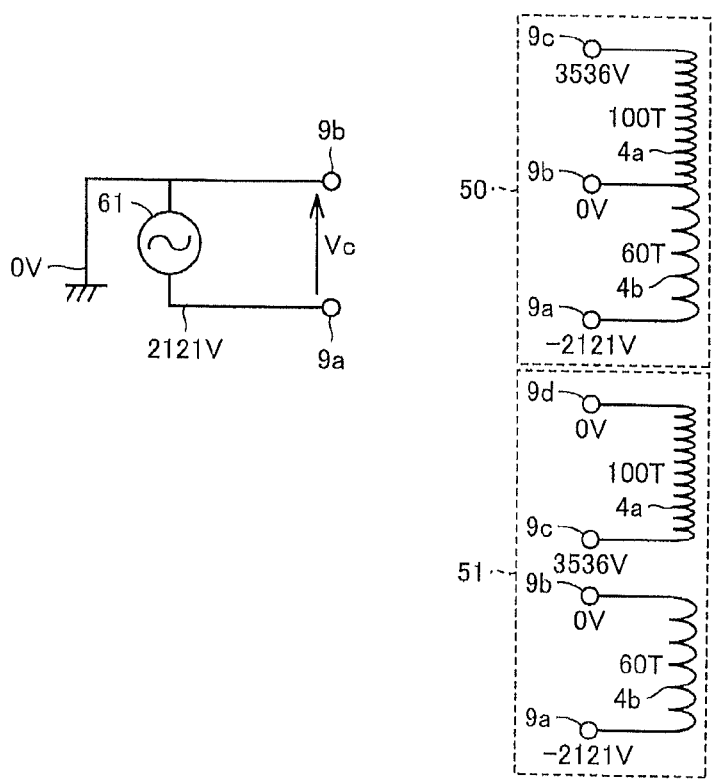
FIG. 22 is a diagram showing a voltage generated in the secondary winding at each timing TB shown in FIG. 20.

Referring to FIGS. 20 and 22, at timing TB shown in FIG. 20, voltages at terminals 9a, 9b and 9c are −2121V, 0V and 3536V, respectively, in transformer 50. In transformer 51, voltages at terminals 9a, 9b, 9c, and 9d are −2121V, 0V, 3536V, and 0V, respectively.

Figure 23:
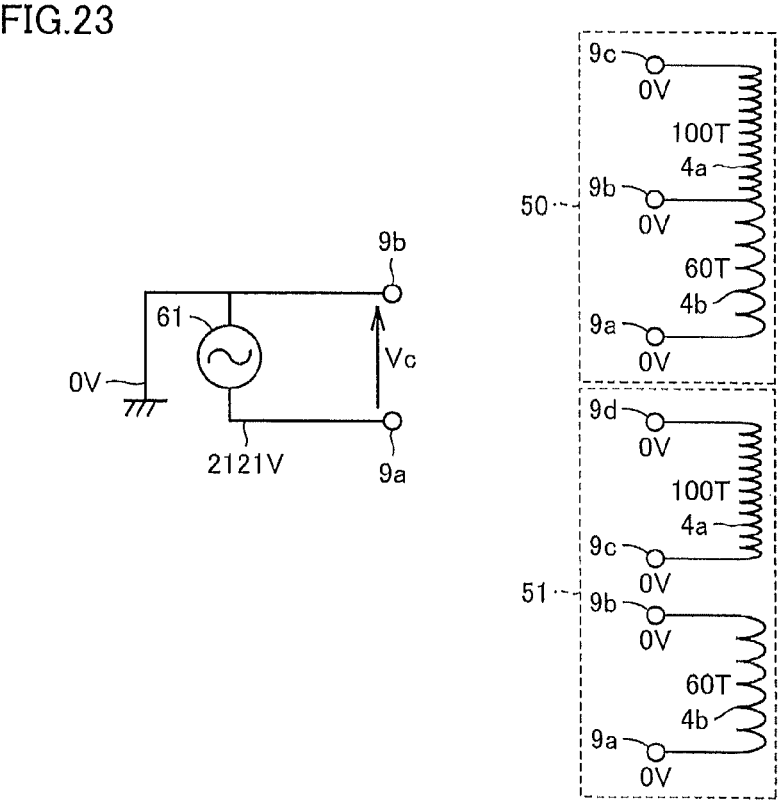
FIG. 23 is a diagram showing a voltage generated in the secondary winding at each timing TC shown in FIG. 20.

Referring to FIGS. 20 and 23, at timing TC shown in FIG. 20, each voltage at terminals 9a, 9b and 9c is 0V in transformer 50. Similarly, in transformer 51, each voltage at terminals 9a, 9b, 9c, and 9d is 0V.

Figure 24:
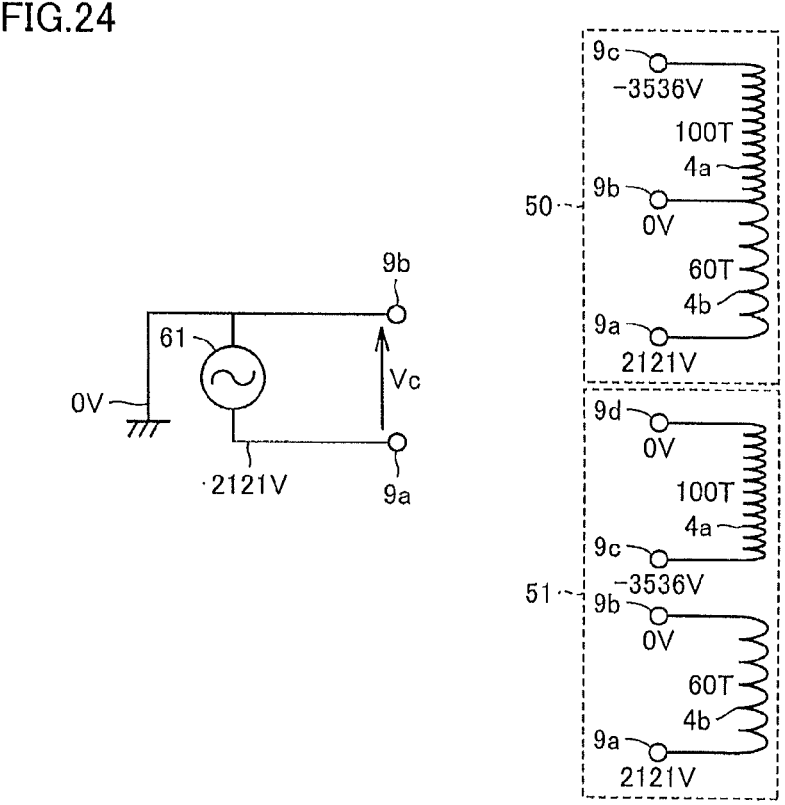
FIG. 24 is a diagram showing a voltage generated in the secondary winding at each timing TD shown in FIG. 20.

Referring to FIGS. 20 and 24, at timing TD shown in FIG. 20, voltages at terminals 9a, 9b and 9c are 2121V, 0V and −3536V, respectively, in transformer 50. Furthermore, in transformer 51, voltages at terminals 9a, 9b, 9c, and 9d are 2121V, 0V, −3536V, and 0V, respectively.

As described above, in voltage transforming apparatus 101, only a voltage of up to 3536V is generated at the terminal of the secondary winding that is not used, as in the case of commonly used AC power supply 61 having one of the terminals grounded. This eliminates the need to increase the insulation size such as the distance between the winding and the iron core or the distance between the winding and the tank, thereby allowing reduction in size and weight of the transformer. Furthermore, when the voltage generated at the terminal of the secondary winding that is not used is decreased, the terminal in the secondary winding can be reduced in size and weight.

In addition, the terminal provided in one secondary winding is independent of (electrically insulated from) the terminal provided in another secondary winding. Consequently, also in the case where the primary side voltage changes due to vehicle running through several sections of different voltages, the secondary winding side can be optimally designed such that an inductance value (L value), a capacitance value (C value) and a resistance value (R value) required for the voltage transforming apparatus can always be ensured.

Stabilized control of the railroad vehicle can be achieved by ensuring the L value, the C value and the R value required for the voltage transforming apparatus. Since the signals of various frequency bands are generally used for the railroad vehicle, consideration should be taken so as to prevent inductive interference from occurring in each type of signal that is caused by high harmonic noise generated from the control devices provided in the vehicle. In the case where the L component of the transformer is not optimized, the above-described inductive interference may occur due to the return current flowing through the transformer out of the ground line. The inductive interference may cause problems that a malfunction is erroneously detected as occurring in the vehicle (electric train) and the control for stopping the vehicle is performed.

Accordingly, in the transformer mounted in the vehicle, the L value is particularly important among the above-described L, C, and R values. Examples of the parameter for determining the L value may include not only one parameter related to the number of turns, but also a plurality of parameters related to the arrangement of the secondary winding (for example, the distance between the primary winding and the secondary winding), and the like.

When transformer 50 is configured such that the numbers of turns of secondary windings 4a and 4b are set at 40T and 60T, respectively, and the potential of terminal 9c is fixed, the induction voltage generated at unused terminal 9a can be lowered during use of terminal 9b. However, in such a configuration, the optimum L value cannot always be achieved also in the case where the AC voltage input into the primary winding changes. On the other hand, as shown in FIG. 5, in the first embodiment of the present invention, a plurality of terminals provided in each of the plurality of secondary windings are independent of another plurality of terminals. Consequently, in the voltage transforming apparatus mounted in the vehicle that runs through several sections of different voltages, each secondary winding can be optimized so as to ensure an optimum L value also in the case where the voltage applied to the primary winding changes.

It is to be noted that transformer 51 may include three or more secondary windings. Furthermore, voltage transforming apparatus 101 is not limited to that including converter 5 and inverter 6, but only need to include a voltage conversion circuit converting the AC voltage induced in the secondary winding into a desirable voltage. Furthermore, converter 5 may be connected not only to the ground node but also to the node to which a fixed voltage is supplied.

Furthermore, according to the first embodiment, the secondary winding connected to converter 5 is switched by switching circuit 8. This allows a desirable voltage to be extracted by one converter provided in common in a plurality of secondary windings. Therefore, the number of converters can be reduced as compared with the configuration in which a plurality of secondary windings are provided with a plurality of converters, respectively.

Second Embodiment

The present embodiment relates to a voltage transforming apparatus provided with a converter that is different in configuration from that of the voltage transforming apparatus according to the first embodiment. In addition, the voltage transforming apparatus according to the second embodiment is mounted in the AC electric train that runs through a plurality of sections in which AC voltages are different. Furthermore, the configuration of the voltage transforming apparatus according to the second embodiment is the same as that shown in each of FIGS. 1 and 4. Therefore, in the following description, only the differences between the second embodiment and the first embodiment will be mainly explained, and detailed description will not be repeated with regard to the features in common between the second embodiment and the first embodiment.

Figure 25:
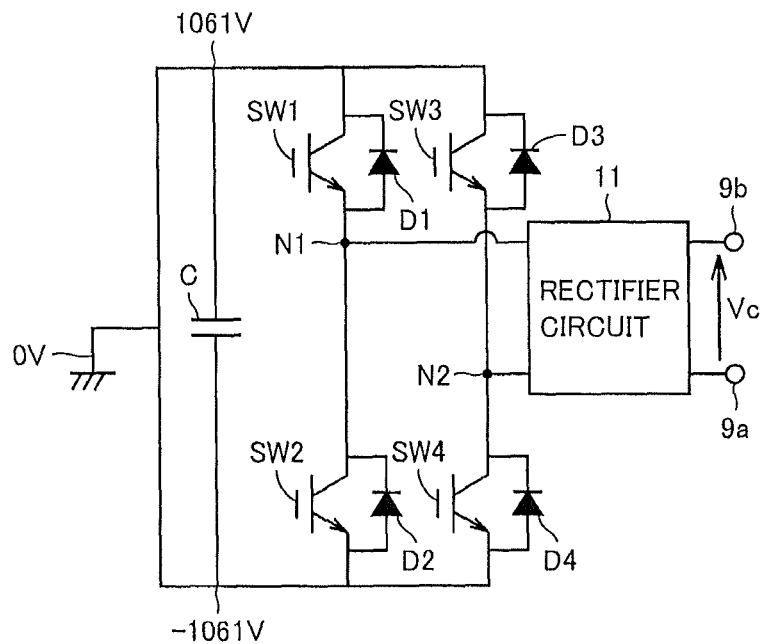
FIG. 25 is a circuit diagram showing the configuration of a converter according to the second embodiment of the present invention.

FIG. 25 is a circuit diagram showing the configuration of the converter according to the second embodiment of the present invention. FIG. 25 representatively shows the state where terminals 9a and 9b of secondary winding 4a are connected to converter 5.

Referring to FIG. 25, this converter 5 is an intermediate ground type converter in which capacitor C has the first end and the second end each connected to the ground potential. In this regard, the converter according to the second embodiment is different from the converter according to the first embodiment.

An explanation will be given with regard to the case where the above-described voltage transforming apparatus 100 and voltage transforming apparatus 101 each include a converter shown in FIG. 25.

Voltage Transforming Apparatus 100

The operation of voltage transforming apparatus 100 will be first described. In this case, the explanation will be made assuming that the number of turns of primary winding 3 is 1000 T, the number of turns of secondary winding 4a is 100 T, and the number of turns of secondary winding 4b is 60 T. Furthermore, the voltage between the terminals of the secondary winding in each of voltage transforming apparatus 100 and voltage transforming apparatus 101 is identical to that in the case of the first embodiment of the present invention. Accordingly, in the following description, the operation of each of voltage transforming apparatuses 100 and 101 will be described with reference to FIGS. 8 and 16, respectively.

Referring to FIG. 8, when the effective value of the primary voltage, that is, the AC voltage received by primary winding 3, is 25000V, secondary winding 4b is connected to converter 5 by switching circuit 8 in voltage transforming apparatus 100.

In secondary winding 4b, a voltage represented by an equation of 25000V/1000 T×60 T=1500V is generated. In other words, an AC voltage having an effective value of 1500V is induced between terminals 9b and 9c. In the case of FIG. 8(a), the voltage between terminals 9b and 9c (zero peak value) is 1061V.

Also in secondary winding 4a that is not used, a voltage in accordance with the turns ratio between primary winding 3 and secondary winding 4a is generated. In secondary winding 4a, a voltage represented by an equation of 25000V/1000 T×(100 T+60 T)=4000V is generated. In other words, an AC voltage having an effective value of 4000V is induced between terminals 9a and 9c. In the case of FIG. 8(b), the voltage between terminals 9a and 9c (zero peak value) is 4596V.

On the other hand, when the effective value of the primary voltage, that is, the AC voltage received by primary winding 3, is 15000V, secondary winding 4a is connected to converter 5 by switching circuit 8 in voltage transforming apparatus 100.

In secondary winding 4a, a voltage represented by an equation of 15000V/1000 T×100 T=1500 V is generated. In other words, an AC voltage having an effective value of 1500V is induced between terminals 9a and 9b. In the case of FIG. 8(c), the voltage between terminals 9a and 9b (zero peak value) is 1061V.

Also in secondary winding 4b that is not used, a voltage in accordance with the turns ratio between primary winding 3 and secondary winding 4b is generated. In secondary winding 4b, a voltage represented by an equation of 15000V/1000 T×(60 T+100 T)=2400V is generated. In other words, in the case of FIG. 8(d), an AC voltage having an effective value of 2400V is induced between terminals 9a and 9c. The voltage between terminals 9a and 9c (zero peak value) is 2333V.

Figure 26:
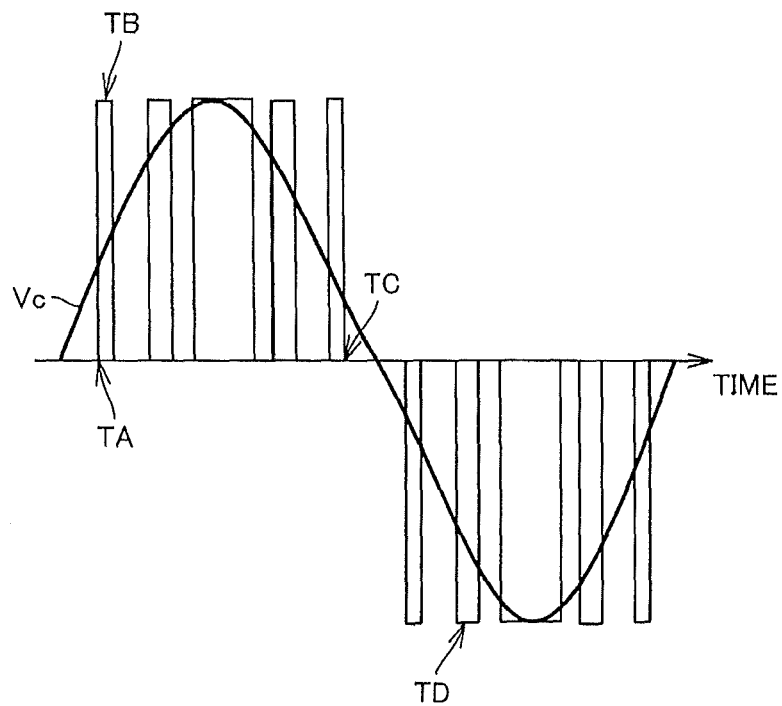
FIG. 26 is a waveform diagram showing the operation of the converter according to the second embodiment of the present invention.

FIG. 26 is a waveform diagram showing the operation of the converter according to the second embodiment of the present invention. FIGS. 27 to 30 each are a diagram showing a voltage generated in the secondary winding and a current generated in the converter at each timing shown in FIG. 26. It is to be noted that FIGS. 27 to 30 each also show the voltage and the current generated in transformer 51.

Referring to FIG. 26, voltage Vc shows a voltage between terminals 9a and 9b. FIG. 26 also shows a voltage pulse waveform obtained by switching (ON/OFF) of switch elements SW1 to SW4.

Figure 27:
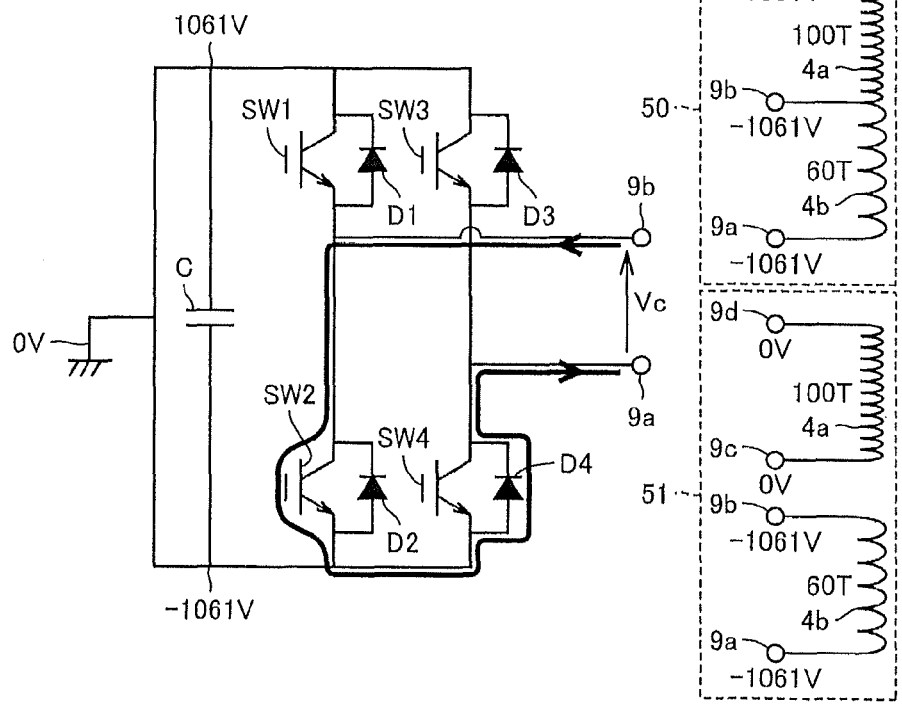
FIG. 27 is a diagram showing a voltage generated in the low-voltage side winding and a current generated in the converter at a timing TA shown in FIG. 26.

Referring to FIGS. 26 and 27, at timing TA shown in FIG. 26, switch element SW1 turns off, switch element SW2 turns on, switch element SW3 turns off, and switch element SW4 turns off. This causes the current to flow through converter 5 as shown by an arrow in FIG. 27, in which case the voltage at each of terminals 9a and 9b is −1061V. At this time, the voltage at terminal 9c is also −1061V.

Figure 28:
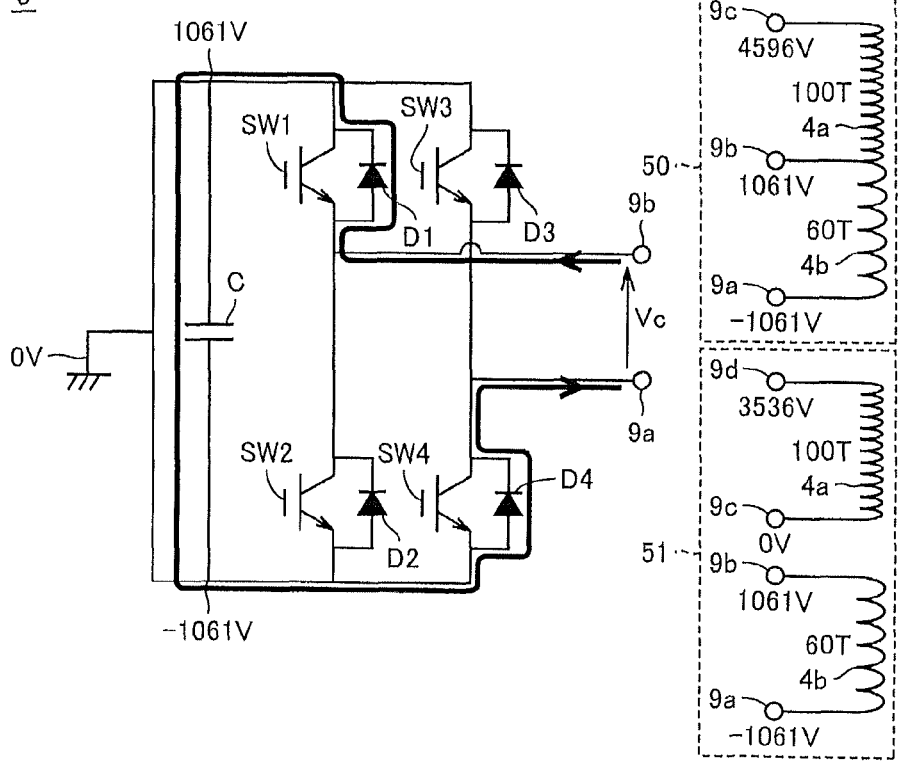
FIG. 28 is a diagram showing a voltage generated in the low-voltage side winding and a current generated in the converter at a timing TB shown in FIG. 26.

Referring to FIGS. 26 and 28, at timing TB shown in FIG. 26, switch element SW1 turns off, switch element SW2 turns off, switch element SW3 turns off, and switch element SW4 turns off. This causes the current to flow through converter 5 as shown by an arrow in FIG. 28, in which case the voltage at terminal 9a is −1061V while the voltage at terminal 9b is 1061V. At this time, the voltage at terminal 9c is 4596V.

Figure 29:
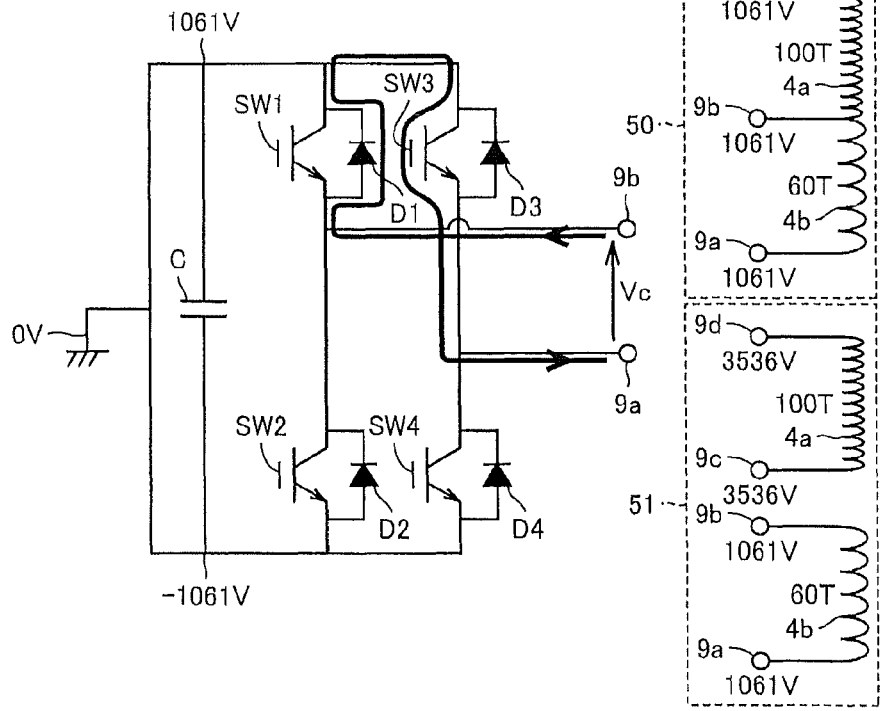
FIG. 29 is a diagram showing a voltage generated in the low-voltage side winding and a current generated in the converter at a timing TC shown in FIG. 26.

Referring to FIGS. 26 and 29, at timing TC shown in FIG. 26, switch element SW1 turns off, switch element SW2 turns off, switch element SW3 turns on, and switch element SW4 turns off. This causes the current to flow through converter 5 as shown by an arrow in FIG. 29, in which case the voltage at terminal 9a is 1061 V while the voltage at terminal 9b is 1061V. At this time, the voltage at terminal 9c is also 1061V.

Figure 30:
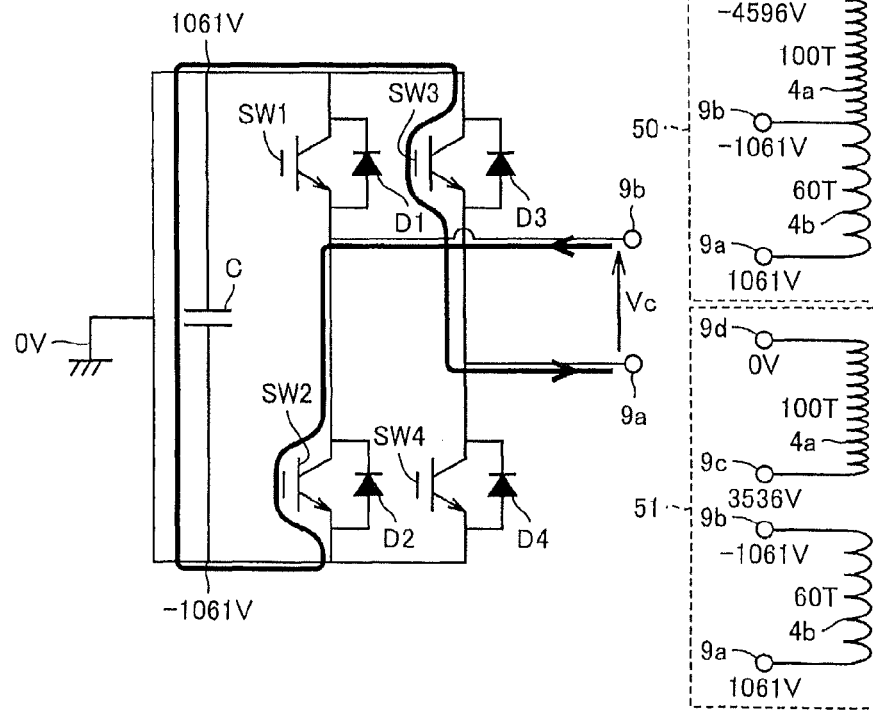
FIG. 30 is a diagram showing a voltage generated in the low-voltage side winding and a current generated in the converter at a timing TD shown in FIG. 26.

Referring to FIGS. 26 and 30, at timing TD shown in FIG. 26, switch element SW1 turns off, switch element SW2 turns on, switch element SW3 turns on, and switch element SW4 turns off. This causes the current to flow through converter 5 as shown by an arrow in FIG. 30, in which case the voltage at terminal 9a is 1061V while the voltage at terminal 9b is −1061V. At this time, the voltage at terminal 9c is −4596V.

As described above, in voltage transforming apparatus 100, a voltage of up to 4596V is generated at the terminal of the secondary winding that is not used. As described also in the first embodiment, this requires an increase in the insulation size such as the distance between the winding and the iron core in the transformer, which makes it difficult to achieve reduction in size and weight of the transformer.

Voltage Transforming Apparatus 101

The operation of voltage transforming apparatus 101 will then be described. When the effective value of the primary voltage, that is, the AC voltage received by primary winding 3, is 25000V, secondary winding 4b is connected to converter 5 by switching circuit 8 in voltage transforming apparatus 101.

In secondary winding 4b, a voltage represented by an equation of 25000V/1000 T×60 T=1500V is generated. In other words, an AC voltage having an effective value of 1500V is induced between terminals 9c and 9d. In the case of FIG. 16(a), the voltage between terminals 9c and 9d (zero peak value) is 1061V.

Also in secondary winding 4a that is not used, a voltage in accordance with the turns ratio between primary winding 3 and secondary winding 4a is generated. However, in voltage transforming apparatus 101, since terminal 9b of secondary winding 4a and terminal 9c of secondary winding 4b are separately provided, only a voltage represented by an equation of 25000V/1000 T×100 T=2500V is generated in secondary winding 4a. In other words, an AC voltage having an effective value of 2500V is induced between terminals 9a and 9b. In the case of FIG. 16(b), the voltage between terminals 9a and 9b (zero peak value) is 3536V.

On the other hand, when the effective value of the primary voltage, that is, the AC voltage received by primary winding 3, is 15000V, secondary winding 4a is connected to converter 5 by switching circuit 8 in voltage transforming apparatus 101.

In secondary winding 4a, a voltage represented by an equation of 15000V/1000 T×100 T=1500V is generated. In other words, an AC voltage having an effective value of 1500V is induced between terminals 9a and 9b. In the case of FIG. 16(c), the voltage between terminals 9a and 9b (zero peak value) is 1061V.

Also in secondary winding 4b that is not used, a voltage in accordance with the turns ratio between primary winding 3 and secondary winding 4b is generated. However, in voltage transforming apparatus 101, since terminal 9b of secondary winding 4a and terminal 9c of secondary winding 4b are separately provided, only a voltage represented by an equation of 15000V/1000 T×60 T=900V is generated in secondary winding 4b. In other words, an AC voltage having an effective value of 900V is induced between terminals 9c and 9d. In the case of FIG. 10(d), the voltage between terminals 9c and 9d (zero peak value) is 1273V.

Then, the voltage and the current generated in transformer 51 will be described. The operation waveform of transformer 51 is the same as that shown in FIG. 26 while the operation of each of switch elements SW1 to SW4 constituting converter 5 is the same as that illustrated in each of FIGS. 27 to 30. In the following, an explanation will be representatively made with regard to the operation in the state where terminals 9a and 9b of secondary winding 4a are connected to converter 5.

Referring to FIGS. 26 and 27, at timing TA shown in FIG. 26, switch element SW1 turns off, switch element SW2 turns on, switch element SW3 turns off, and switch element SW4 turns off. This causes the current to flow through converter 5 as shown by an arrow in FIG. 27, in which case the voltage at each of terminals 9a and 9b is −1061V. At this time, the voltage at each of terminals 9c and 9d is also 0V.

Referring to FIGS. 26 and 28, at timing TB shown in FIG. 26, switch element SW1 turns off, switch element SW2 turns off, switch element SW3 turns off, and switch element SW4 turns off. This causes the current to flow through converter 5 as shown by an arrow in FIG. 28, in which case the voltage at terminal 9a is −1061V while the voltage at terminal 9b is 1061V. At this time, the voltage at terminal 9c is 0V while the voltage at terminal 9d is 3536V.

Referring to FIGS. 26 and 29, at timing TC shown in FIG. 26, switch element SW1 turns off, switch element SW2 turns off, switch element SW3 turns on, and switch element SW4 turns off. This causes the current to flow through converter 5 as shown by an arrow in FIG. 29, in which case the voltage at terminal 9a is 1061V while the voltage at terminal 9b is 1061V. At this time, the voltage at terminal 9c is 3536V while the voltage at terminal 9d is 3536V.

Referring to FIGS. 26 and 30, at timing TD shown in FIG. 26, switch element SW1 turns off, switch element SW2 turns on, switch element SW3 turns on, and switch element SW4 turns off. This causes the current to flow through converter 5 as shown by an arrow in FIG. 30, in which case the voltage at terminal 9a is 1061V while the voltage at terminal 9b is −1061V. At this time, the voltage at terminal 9c is 3536V while the voltage at terminal 9d is 0V.

As described above, in voltage transforming apparatus 101, even when an intermediate ground type converter shown in FIG. 25 is provided, only a voltage of up to 3536V is generated at the terminal of the secondary winding that is not used, as in the case of a commonly-used AC power supply 61. Therefore, according to the second embodiment, the transformer can be reduced in size and weight as in the first embodiment. Furthermore, the voltage generated at the terminal of the secondary winding that is not used is decreased, thereby allowing reduction in size and weight of the terminal of the secondary winding.

In addition, each of the above-described embodiments presents the so-called shell-type transformer having a high-voltage winding and a low-voltage winding that are surrounded by an iron core. It is to be noted that the present invention is also applicable to the so-called core-type transformer having a high-voltage winding and a low-voltage winding that are arranged around an iron core. Also in the core-type transformer, it is essential to minimize the insulation distance between the winding and the iron core in order to reduce the size and the weight of the transformer. Therefore, the transformer can be reduced in size and weight by applying the present invention to a core-type transformer.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 overhead wire, 2 pantograph, 3 primary winding (high-voltage side coil), 4a, 4b secondary winding (low-voltage side coil), 4c planar coil, 5 converter, 6 inverter, 7 motor, 8 switching circuit, 9, 9a, 9b, 9c, 9d terminal, 10 iron core, 10a main leg, 10b, 10c side leg, 10b1, 10b2 leg, 11 rectifier circuit, 21 tank, 22 motor-driven blower, 23 cooler, 24 conservator, 50, 51 transformer, 61 AC power supply, 100, 101 voltage transforming apparatus, 200 railroad vehicle, 211 vehicle body, 212 floor, SW1 to SW4 switch element, D1 to D4 diode, C capacitor, N1, N2 node, W1, W2 window.

The invention claimed is:

1. A voltage transforming apparatus to be mounted in a vehicle, said voltage transforming apparatus comprising:
  a primary winding receiving an AC voltage;
  a plurality of secondary windings that are different in number of turns; and
  a voltage conversion circuit for converting an AC voltage induced in each of said plurality of secondary windings into a desirable voltage,
  each of said plurality of secondary windings including a first terminal and a second terminal each having a potential that is not fixed, and said first terminal and said second terminal being separately provided in each of said secondary windings, said voltage transforming apparatus further comprising:
a switching circuit for selectively connecting said first terminal and said second terminal of each of said plurality of secondary windings to said voltage conversion circuit,
said vehicle running through a plurality of sections of a path of travel in which AC voltages are different,
said voltage transforming apparatus further comprising an iron core,
said iron core including
a main leg around which said primary winding and said plurality of secondary windings are wound, and
a side leg connected to said main leg so as to surround said primary winding and said plurality of secondary windings,
said plurality of secondary windings including first and second secondary windings, and
said first and second secondary windings being wound around said main leg so as to sandwich said primary winding.

2. The voltage transforming apparatus according to claim 1, further comprising a tank housing said primary winding, said plurality of secondary windings and said iron core.

3. The voltage transforming apparatus according to claim 1, wherein each of said primary winding and said plurality of secondary windings is a conductor wound on a flat plane that is vertical to an axis around which the windings are wound.

4. The voltage transforming apparatus according to claim 1, wherein
said voltage conversion circuit includes a switch element connected between a fixed potential node having a fixed voltage supplied thereto and said switching circuit, and
said first terminal and said second terminal of each of said plurality of secondary windings are connected through said switching circuit and said switch element to said fixed potential node.

5. The voltage transforming apparatus according to claim 4, wherein said voltage conversion circuit has a first input terminal and a second input terminal which are connected to said first terminal and said second terminal, respectively, of each of said secondary windings through said switching circuit, and operates such that a potential of said first input terminal and a potential of said second input terminal are alternately connected to said fixed potential node through said switch element.

* * * * *